United States Patent
Lee et al.

(10) Patent No.: US 8,411,245 B2
(45) Date of Patent: Apr. 2, 2013

(54) MULTI-DISPLAY MIRROR SYSTEM AND METHOD FOR EXPANDED VIEW AROUND A VEHICLE

(75) Inventors: Ethan J. Lee, Byron Center, MI (US); Daniel B. Lee, Wyoming, MI (US); Michael G. Hendricks, Wyoming, MI (US); Mark R. Roth, Coloma, MI (US); Craig R. Myers, Holland, MI (US); G. Bruce Poe, Hamilton, MI (US); David A. Blaker, Holland, MI (US); Carsten Schaudel, Erlenbach (DE); Mark A. VanVuuren, Dorr, MI (US); John A. VanderPloeg, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 654 days.

(21) Appl. No.: 12/570,585

(22) Filed: Sep. 30, 2009

(65) Prior Publication Data

US 2010/0201816 A1    Aug. 12, 2010

Related U.S. Application Data

(63) Continuation-in-part of application No. 12/367,143, filed on Feb. 6, 2009, now Pat. No. 8,237,909.

(51) Int. Cl.
*G02F 1/13* (2006.01)
*G02F 1/133* (2006.01)

(52) U.S. Cl. .......................................... 349/195; 349/73

(58) Field of Classification Search ................ 349/1, 16, 349/193, 195, 61–67, 73–74
See application file for complete search history.

(56) References Cited

U.S. PATENT DOCUMENTS

| | | |
|---|---|---|
| 5,289,321 A | 2/1994 | Secor |
| 5,670,935 A | 9/1997 | Schofield et al. |
| 5,825,527 A | 10/1998 | Forgette et al. |
| 5,883,605 A | 3/1999 | Knapp |
| 5,956,181 A | 9/1999 | Lin |
| 5,959,555 A | 9/1999 | Furuta |
| 6,002,983 A | 12/1999 | Alland et al. |
| 6,046,766 A | 4/2000 | Sakata |
| 6,170,956 B1 | 1/2001 | Rumsey et al. |
| 6,184,781 B1 | 2/2001 | Ramakesavan |
| 6,320,612 B1 | 11/2001 | Young |
| 6,346,698 B1 | 2/2002 | Turnbull |
| 6,369,701 B1 | 4/2002 | Yoshida et al. |
| 6,407,468 B1 | 6/2002 | LeVesque et al. |
| 6,420,800 B1 | 7/2002 | LeVesque et al. |
| 6,424,273 B1 | 7/2002 | Gutta et al. |
| 6,476,855 B1 | 11/2002 | Yamamoto |
| 6,552,326 B2 | 4/2003 | Turnbull |

(Continued)

FOREIGN PATENT DOCUMENTS

| | | |
|---|---|---|
| JP | 1178693 | 3/1999 |
| KR | 10-2009-0031998 | 3/2009 |

OTHER PUBLICATIONS

Patent Cooperation Treaty Communication, International Search Report, mailed Jun. 29, 2011, 3 pages.

*Primary Examiner* — Dung T. Nguyen

(74) *Attorney, Agent, or Firm* — Price Heneveld LLP; Scott P. Ryan

(57) ABSTRACT

A multi-display vehicular rearview mirror system (2600) and method includes an electrochromic (EC) glass element (2603) and a plurality of liquid crystal displays (LCDs) (2605a, 2605b, 2605c) positioned behind EC element (2603). A plurality of light emitting diodes (LEDs) (2610a, 2610b, 2610c) are used for providing backlighting for each respective LCD of the plurality of LCDs such that the LCDs utilize a plurality of imaging devices (2717, 2719, 2721) for forming substantially a single image across the plurality of LCDs (2605a, 2605b, 2605c).

25 Claims, 20 Drawing Sheets

U.S. PATENT DOCUMENTS

| | | |
|---|---|---|
| 6,559,761 B1 | 5/2003 | Miller et al. |
| 6,572,233 B1 | 6/2003 | Northman et al. |
| 6,693,524 B1 | 2/2004 | Payne |
| 6,737,630 B2 | 5/2004 | Turnbull |
| 6,870,655 B1 | 3/2005 | Northman et al. |
| 6,912,001 B2 | 6/2005 | Okamoto et al. |
| 6,923,080 B1 | 8/2005 | Dobler et al. |
| 7,038,577 B2 | 5/2006 | Pawlicki et al. |
| 7,050,908 B1 | 5/2006 | Schwartz et al. |
| 7,095,567 B2 | 8/2006 | Troxell et al. |
| 7,168,830 B2 | 1/2007 | Pastrick et al. |
| 7,175,291 B1 | 2/2007 | Li |
| 7,206,697 B2 | 4/2007 | Olney et al. |
| 7,227,472 B1 | 6/2007 | Roe |
| 7,245,231 B2 | 7/2007 | Kiefer et al. |
| 7,302,344 B2 | 11/2007 | Olney et al. |
| 7,317,386 B2 | 1/2008 | Lengning et al. |
| 7,324,043 B2 | 1/2008 | Purden et al. |
| 7,327,226 B2 | 2/2008 | Turnbull et al. |
| 7,327,855 B1 | 2/2008 | Chen |
| 7,331,415 B2 | 2/2008 | Hawes et al. |
| 7,349,582 B2 | 3/2008 | Takeda et al. |
| 7,355,524 B2 | 4/2008 | Schofield |
| 7,368,714 B2 | 5/2008 | Remillard et al. |
| 7,379,814 B2 | 5/2008 | Ockerse et al. |
| 7,380,633 B2 | 6/2008 | Shen et al. |
| 7,391,563 B2 | 6/2008 | McCabe et al. |
| 7,505,047 B2 | 3/2009 | Yoshimura |
| 7,855,755 B2 | 12/2010 | Weller et al. |
| 8,031,225 B2 | 10/2011 | Watanabe et al. |
| 8,144,033 B2 * | 3/2012 | Chinomi et al. .............. 340/937 |
| 2005/0231969 A1 | 10/2005 | Fogg et al. |
| 2005/0264891 A1 | 12/2005 | Uken et al. |
| 2007/0080585 A1 | 4/2007 | Lyu |
| 2009/0096397 A1 | 4/2009 | Bauer et al. |
| 2009/0096937 A1 | 4/2009 | Bauer et al. |
| 2009/0243824 A1 | 10/2009 | Peterson et al. |
| 2010/0289995 A1 | 11/2010 | Hwang et al. |

* cited by examiner

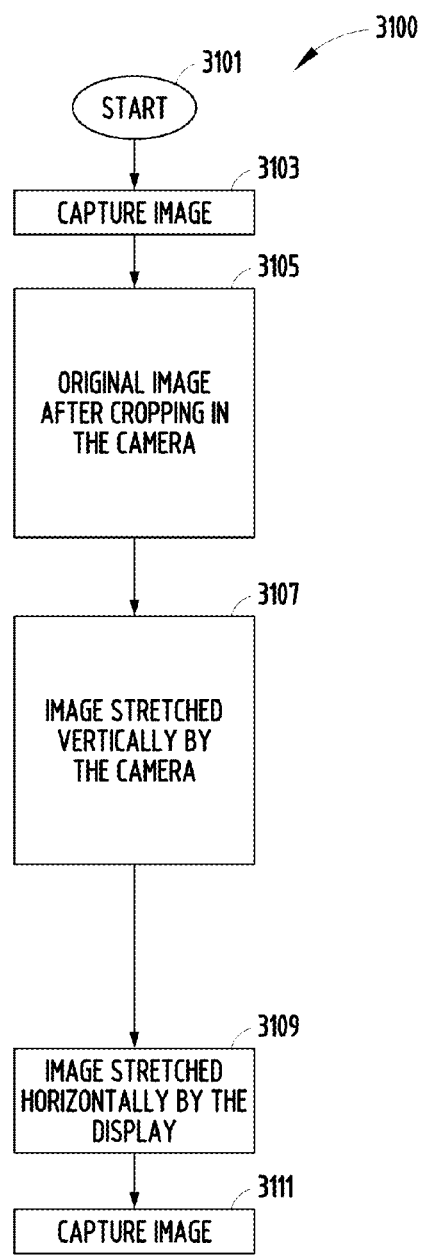
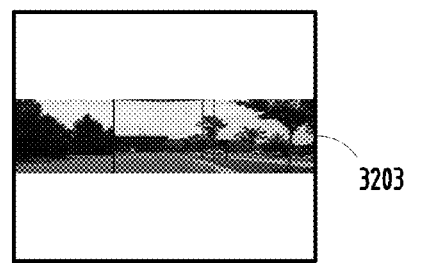
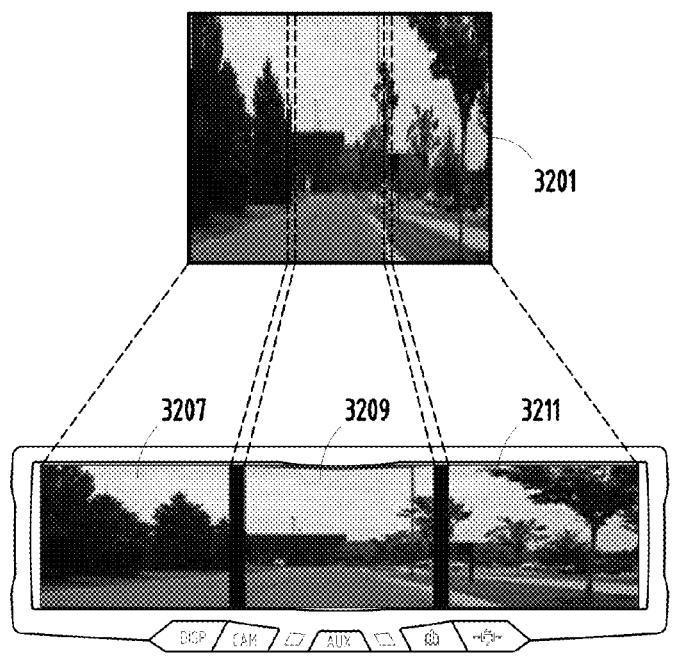
FIG. 31
FIG. 32

MULTI-DISPLAY MIRROR SYSTEM AND METHOD FOR EXPANDED VIEW AROUND A VEHICLE

PRIORITY TO RELATED APPLICATIONS

This application is a continuation-in-part of U.S. patent application Ser. No. 12/367,143 entitled "A VEHICULAR REARVIEW MIRROR ASSEMBLY INCLUDING INTEGRATED BACKLIGHTING FOR A LIQUID CRYSTAL DISPLAY (LCD)" filed Feb. 6, 2009 now U.S. Pat. No. 8,237,909 and commonly assigned to Gentex Corporation and claims priority under 35 U.S.C. §120.

BACKGROUND OF THE INVENTION

A backlight is a form of illumination used in liquid crystal displays (LCDs). Backlights illuminate the LCD from the side or back of the display panel, unlike front lights, which are placed in front of the LCD. Backlights are used in small displays to increase readability in low light conditions and in computer displays and LCD televisions to produce light in a manner similar to a cathode ray tube (CRT) display. The typical LCD backlight has traditionally been cold cathode fluorescent lamps (CCFLs). Increasingly, however, light-emitting diodes (LEDs) are becoming the predominant backlighting technology of choice.

Currently, LED backlighting is most commonly used in small, inexpensive LCD panels. Recent advances in LED technology, packaging, and materials have provided dramatic increases in LED brightness which, in turn, has led to the use of the LED in all types of lighting applications, including LCD backlights. The challenge for LED backlights is to get the heat out of the LED device itself and then out of the display assembly. Other than the performance of the LCD, backlighting is often the most important technology affecting display image quality. Although incandescent backlighting can be used when very high brightness is desired, the use of incandescent bulbs has many drawbacks, such as limited life and the amount of heat generated, which often means that the bulb needs to be mounted away from the display. Over the last several years, small color LCD displays have been integrated into an ever-broadening range of products. Color displays, once considered a luxury in electronic products, are now a standard offering even at the entry level. Fortunately, the economies of scale have lowered the cost of LCD color displays, making them attractive for integration in many different types of electronic products and instruments.

Color LCD displays typically require a white backlight for proper viewing in any lighting environment. This backlight subsystem most often consists of an array of high brightness white LEDs, a diffuser to distribute the light, and a backlight driver to convert the available power into regulated constant current to drive the LEDs. The size of the display will often determine the number of LEDs required for its backlighting. For LEDs, the light output is proportional to current, and since LEDs have a very steep I-V curve, it is important that the current through the LEDs be closely matched to ensure even lighting since LEDs are typically distributed across one edge of the LCD display. In addition, software control is necessary so the user can adjust the brightness and compensate for ambient light conditions. The color point of the LED can shift depending on the current through the LED, so it is common to set the LED current to a fixed value and pulse-width modulate the LEDs to reduce the average light output. There are a number of factors that need to be considered when incorporating a small color LCD display into a design to achieve the right balance of cost and performance.

Small LCD displays have also been used in connection with automotive applications, such as in an automotive mirror. Applications illustrating various types of automotive mirror displays are shown in U.S. Pat. Nos. 6,870,655; 6,737,630; 6,572,233; 6,552,326; 6,420,800; 6,407,468; 6,346,698; 6,170,956; 5,883,605; and 5,825,527, U.S. patent application Ser. No. 12/193,426 entitled "Vehicle Rearview Assembly Including A Display for Displaying Video Captured by a Camera and User Instructions," and U.S. patent application Ser. No. 12/196,476 entitled "Discrete LED Backlight Control for a Reduced Power LCD Display System," all commonly assigned to Gentex Corporation and all of which are incorporated herein by reference in their entireties. A common example of a video display located directly in an auto dimming rearview mirror is when it is paired with a rear camera display (RCD). In this application, the display shows a real-time panoramic view of the rear of the vehicle. The LCD display automatically appears through the mirror glass when the vehicle is shifted into reverse. The display disappears when the vehicle is shifted into any other gear. In operation, a 60 mm LCD or the like appears through the mirror's reflective surface. The result is a bright, high-resolution display in an intuitive location useful to the driver.

In other applications, such as that shown in U.S. Pat. No. 5,289,321 to Secor, cameras are used on the sides of the vehicle for providing video information to a plurality of video displays located in the mirror. In this example, one camera is associated with each of three video screens allowing the user to see to the rear of the vehicle on the vehicle left, right and center. One drawback of this type of system is that the information is dedicated from one camera to one display, preventing the user from fully utilizing such an arrangement.

BRIEF DESCRIPTION OF THE DRAWINGS

The subject matter that is regarded as the invention is particularly pointed out and distinctly claimed in the claim portion that concludes the specification. The invention, together with further objects and advantages thereof, may best be understood by reference to the following description taken in conjunction with the accompanying drawings, where like numerals represent like components, and in which:

FIG. 31 is a block diagram illustrating steps used by the multi-display mirror system to provide a panoramic image.

FIG. 32 is an illustration of the images used to form the panoramic image on the multi-display mirror system.

DETAILED DESCRIPTION OF THE INVENTION

Figure 1:
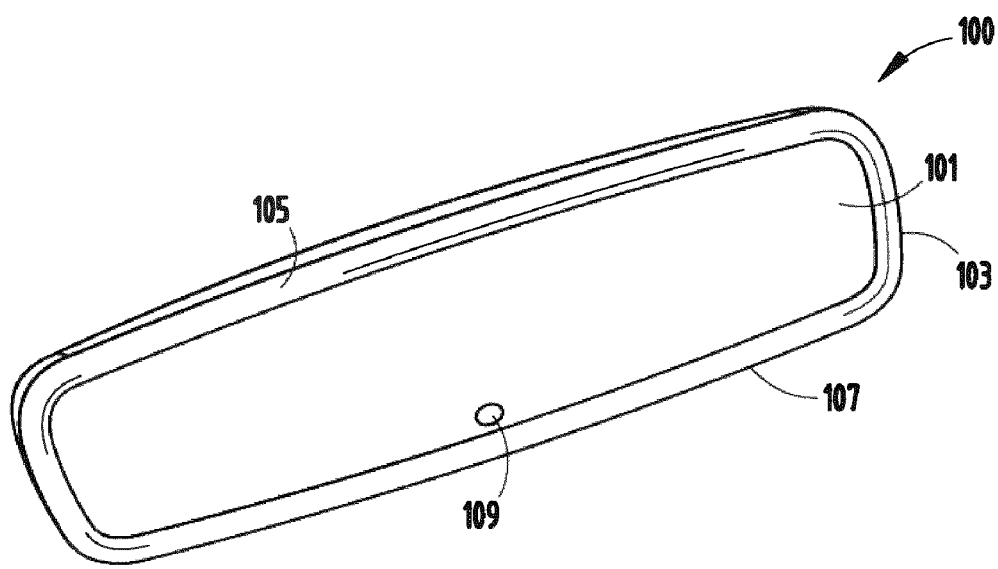
FIG. 1 is a front perspective view of the automotive mirror assembly with backlighting according to an embodiment of the invention.

Before describing in detail embodiments that are in accordance with the present invention, it should be observed that the embodiments reside primarily in combinations of method steps and apparatus components related to an automotive mirror assembly including backlighting for an LCD. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is a front prospective view of the automotive mirror assembly 100 with backlighting according to an embodiment of the invention. The automotive mirror assembly includes a mirror element 101 that is positioned within a mirror bezel 103 formed by a top bezel 105 and bottom bezel 107. A sensor cover 109 is positioned within the mirror glass 101 and works to cover a light sensor (not shown) that works to control the reflectivity of an electrochromic glass sheet (not shown) used in connection with the mirror element 101. A hollow space or void (not shown) can also be used with the mirror for inserting a compass, thermometer, or other electronic device for aiding the driver in vehicle operations. Although not shown in FIG. 1, the bezel may include one or more buttons or other actuators the work to control various functions of the automotive mirror assembly.

Figure 2:
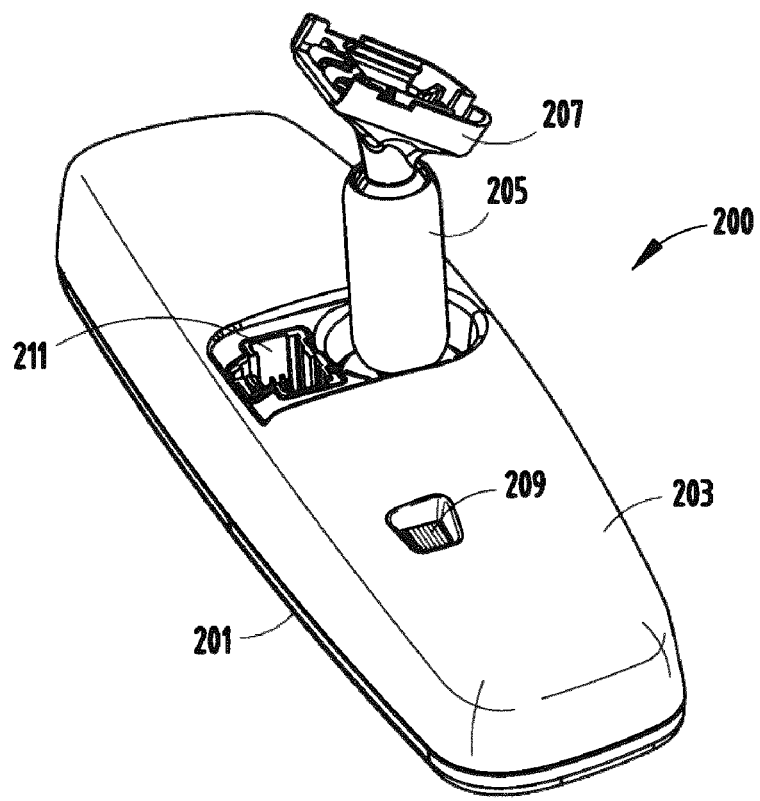
FIG. 2 is a rear perspective view of the automotive mirror assembly shown in FIG. 1.

Similarly, FIG. 2 is a rear perspective view of the automotive mirror assembly shown in FIG. 1. The mirror assembly 200 is shown where the bezel 201 is connected to a mirror housing 103. A pivotable shaft 205 is used in connection with an adjustable wedge mount 207 that is used for fastening the mirror housing 203 to an automotive windshield. The shaft 205 and wedge mount 207 operate to allow the driver to move the mirror into a desired position for viewing objects from behind the driver through the rear glass window.

Figure 3:
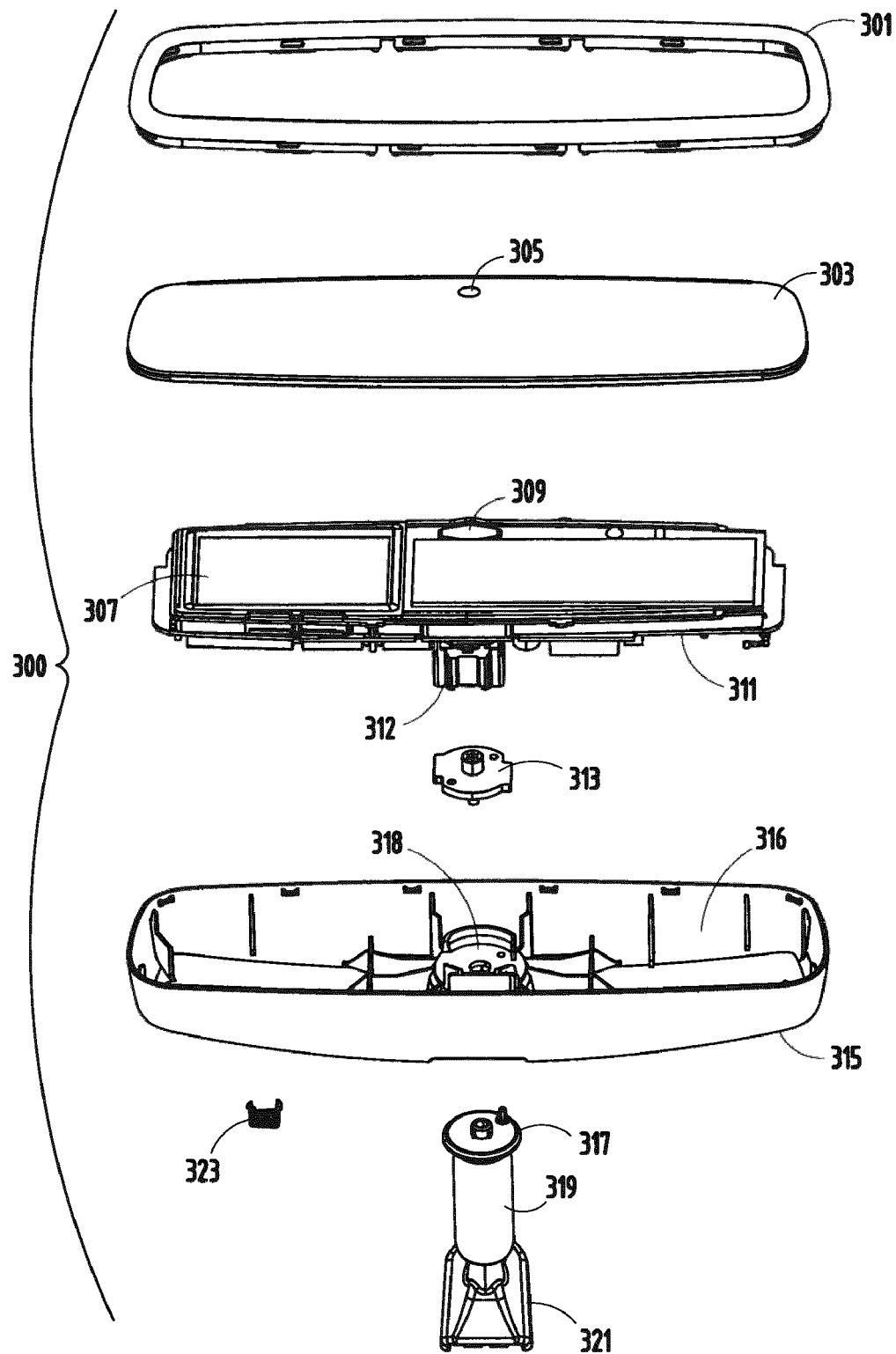
FIG. 3 is a top exploded view of the automotive mirror assembly as shown in FIG. 1.

FIG. 3 is a top exploded view of the automotive mirror assembly as shown in FIG. 1. The automotive mirror assembly 300 includes the bezel 301 positioned above the mirror glass 303. The mirror glass 303 includes an aperture 305 allowing light to pass through the mirror glass 303 to a glare detector 305. The glare detector 305 and LCD 307 are positioned on a circuit board 311 that uses a rear connector 312 to supply power to the circuit board 311. A mounting fastener 313 is used behind the rear connector 312 for fastening components in the mirror housing 315. The fastener 313 nests within a housing 315 having a void or cavity 316 and contour area 318. As will be evident to those skilled in the art, each of the components, such as the circuit board 311, mirror 303, and bezel 301, are form-fit to rest within the cavity 316. A fastener 317 connects to the rear of the housing 315 which extends to a shaft 319 that mates with a mount 321 for attachment to the front windshield (not shown). A lens 323 works to allow light to enter an aperture (not shown) in the rear of the housing for detecting light, images, or other data that can be used to aid the driver in vehicle operations. Lens 323 directs ambient light to a light sensor that is used to detect ambient light levels to control LCD brightness and EC glare sensitivity.

Figure 4:
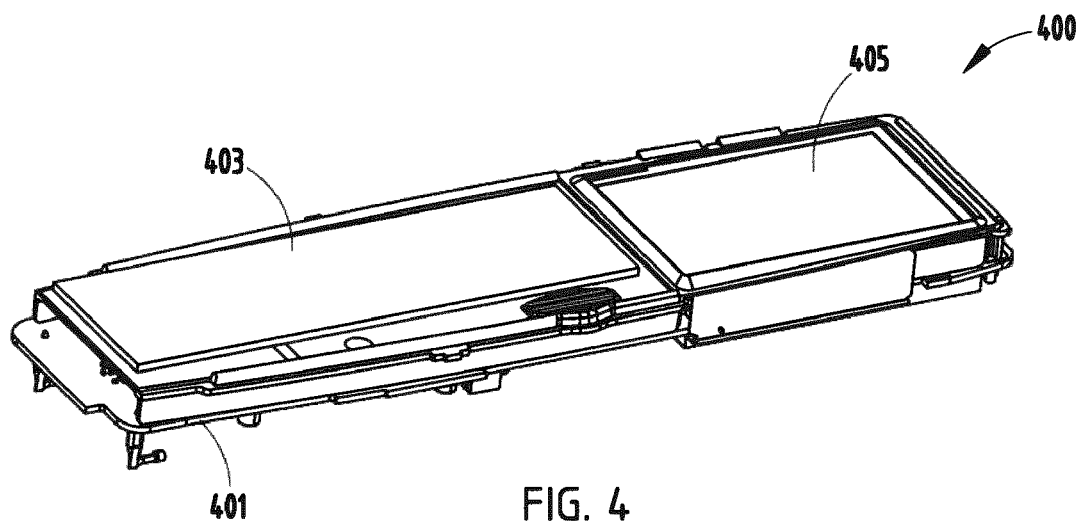
FIG. 4 is a top perspective view of the circuit board as used in an embodiment of the invention.
Figure 5:
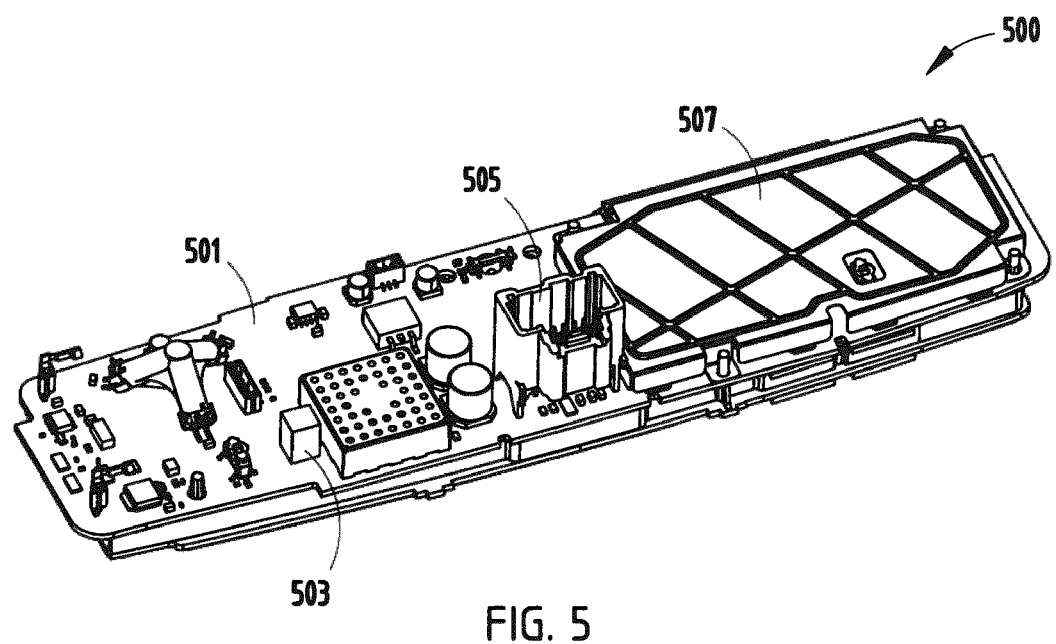
FIG. 5 is a bottom perspective view of the circuit board assembly shown in FIG. 4.

FIG. 4 is a top perspective view of the LCD mounted on a circuit board assembly. The circuit board assembly 400 includes a printed circuit board 401 that is positioned under a support plate 403 for providing a supporting surface. The LCD 405 is mounted to the circuit board without the use of any external daughter board or the like where a plurality of light emitting diodes (LEDs) (not shown) are positioned behind the LCD 405 for backlighting the LCD to illuminate liquid crystal elements. Similarly, FIG. 5 is a bottom perspective view of the circuit board assembly shown in FIG. 4. The circuit board assembly 500 includes the circuit board 501 which is populated with various mechanical and electronic components used to provide functionality of the mirror and its user. The male connector 505 is used to provide power to various electronic components 503 as well as the LCD. A shield assembly 507 is used at the rear of the LCD to prevent radio frequency (RF) emissions from interfering with other components on the circuit board or within the vehicle.

Figure 6A:
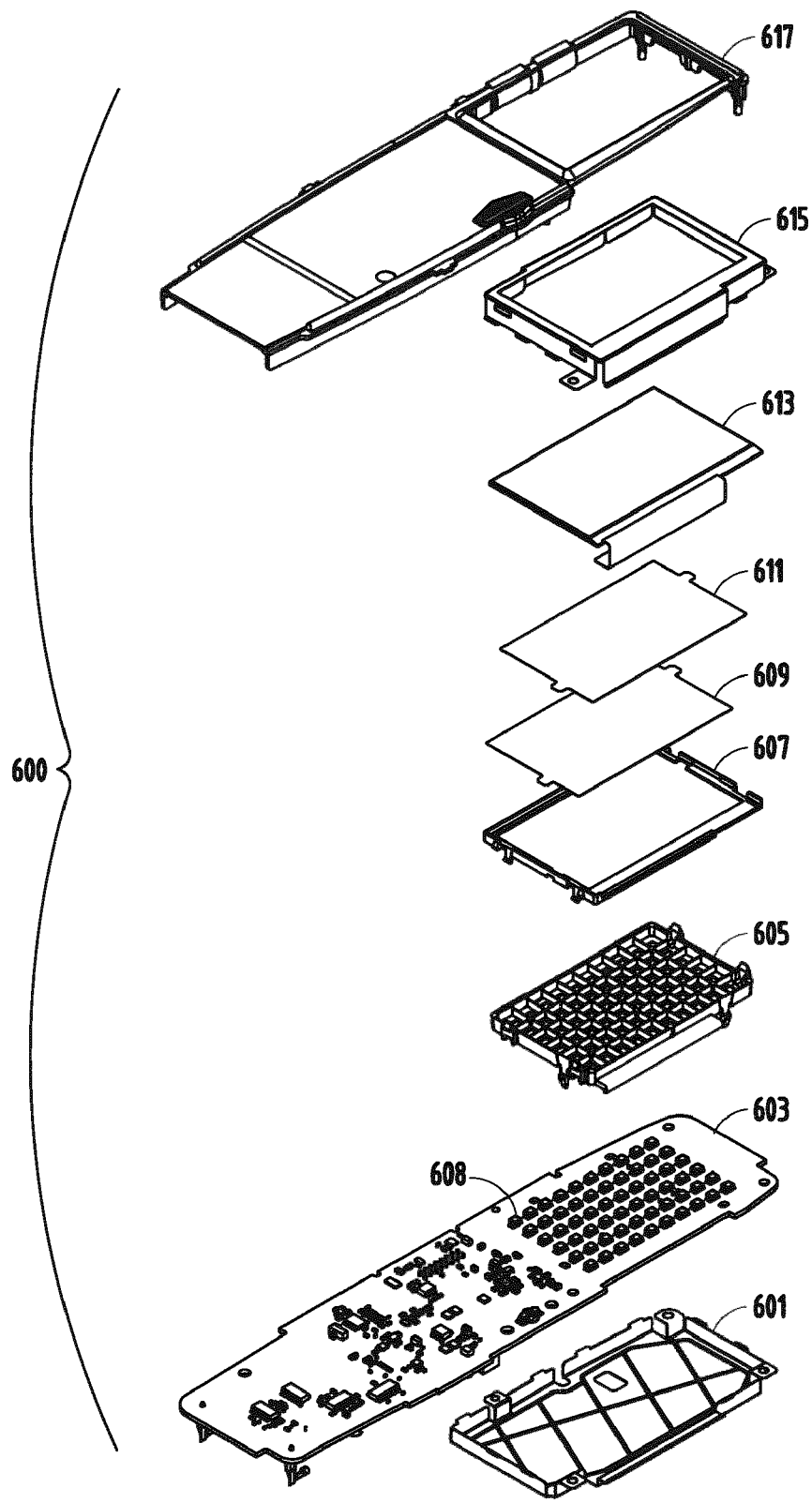
FIGS. 6A and 6B are a top exploded view and bottom exploded view, respectively, of the automotive mirror assembly with backlighting as shown in FIG. 1.
Figure 6B:
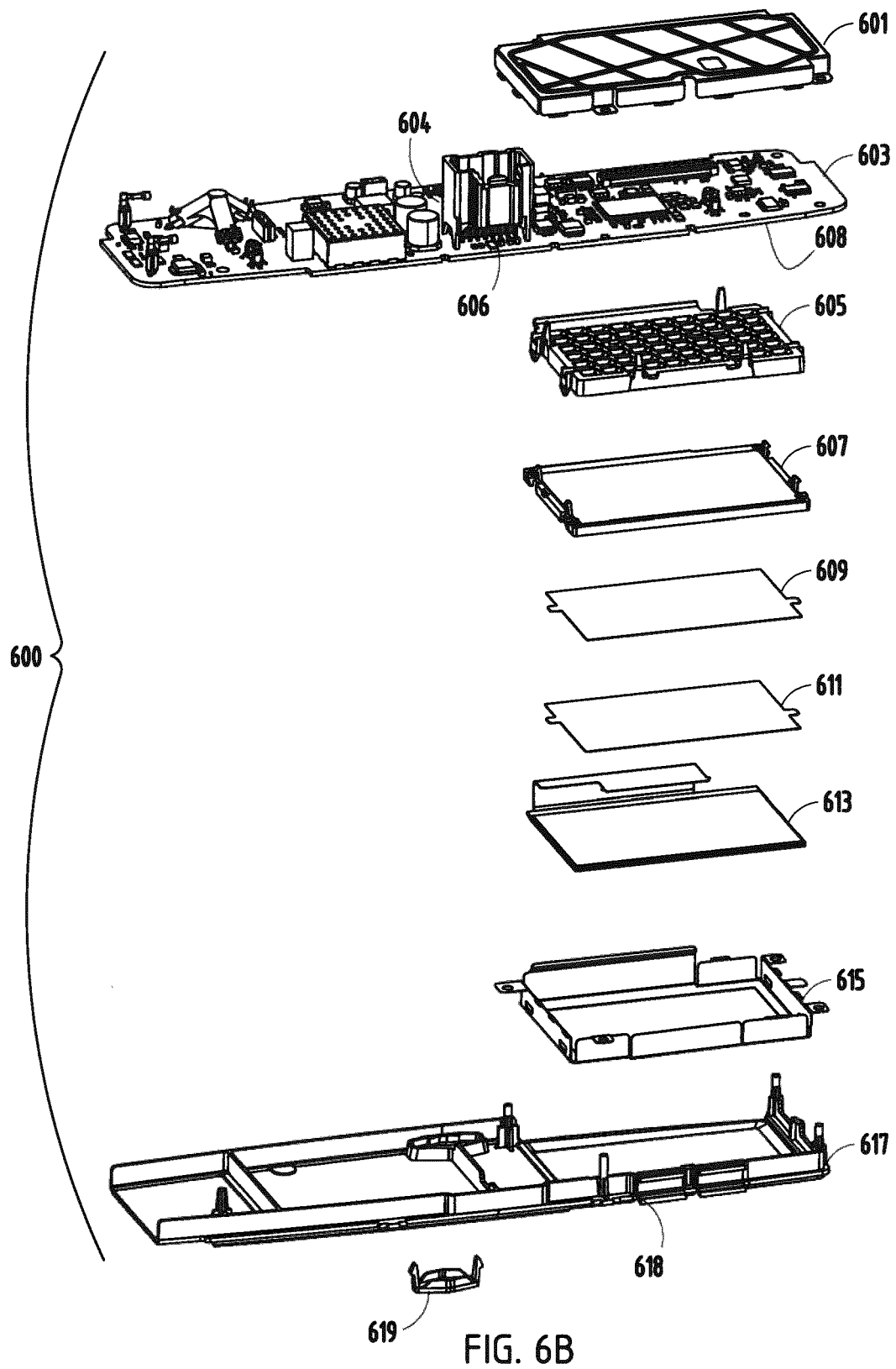

FIGS. 6A and 6B are top and bottom exploded views of an LCD assembly for use in the rearview mirror assembly as shown in FIG. 1. The LCD assembly 600 includes a rear shield 601 for blocking RF radiation emitted by the LCD. A printed circuit board 603 is used for mounting electronic components 604 as well as a female connector 606 for providing power to the components 604 and LCD. A reflector 605 is positioned under the printed circuit board 603 and is used to reflect light from a plurality of LEDs 608. A diffuser 607 is located adjacent to the reflector 605 and works to diffuse, spread out, or scatter light from the LED array to provide a more uniform or soft light across the rear surface of the LCD 613. As will be evident to those skilled in the art, optical diffusers use different methods to diffuse light and can include ground glass diffusers, Teflon diffusers, holographic diffusers, opal glass diffusers, and grayed glass diffusers. A first optical film 609 and second optical film 611 are positioned in front of the diffuser and are manufactured using a thin polyester base material that is primarily used for LCD panels for providing brightness enhancement through exit angle control as used with the LCD 613. Brightness enhancement films (BEF) work by refracting usable light towards the viewer and reflecting most of the remaining light back into the display, where it is recycled. By using two BEFs crossed at 90°, the viewing angle can increase the display brightness by up to 60%. Using two sheets crossed at 90°, the display brightness can be increased up to 120%, however, the viewing angle can be influenced by the prism geometry.

The LCD 613 is typically a color LCD, which is an electronically-modulated optical device shaped into a thin, flat panel made up of any number of color or monochrome pixels filled with liquid crystals and arrayed in front of the light source backlight or reflector 605. It is often utilized in many electronic devices because it uses a small amount of electric power as compared to a plasma or cathode ray tube (CRT) display. A front shield 615 is used to encase the LCD assembly with the front shield 601 to contain any RF emissions. Finally, a support plate 617 is used in conjunction with a conductive elastomer 618, as further described herein, to provide a supporting surface of the LCD assembly 600 when in a compressed or assembled condition. The conductive elastomer 618 provides a good DC and RF voltage ground between components in the LCD assembly 600. Finally, a glare lens 619 is used to diffuse light entering an aperture within the support plate for use by a light sensor (not shown) located on the printed circuit board 603.

Figure 7:
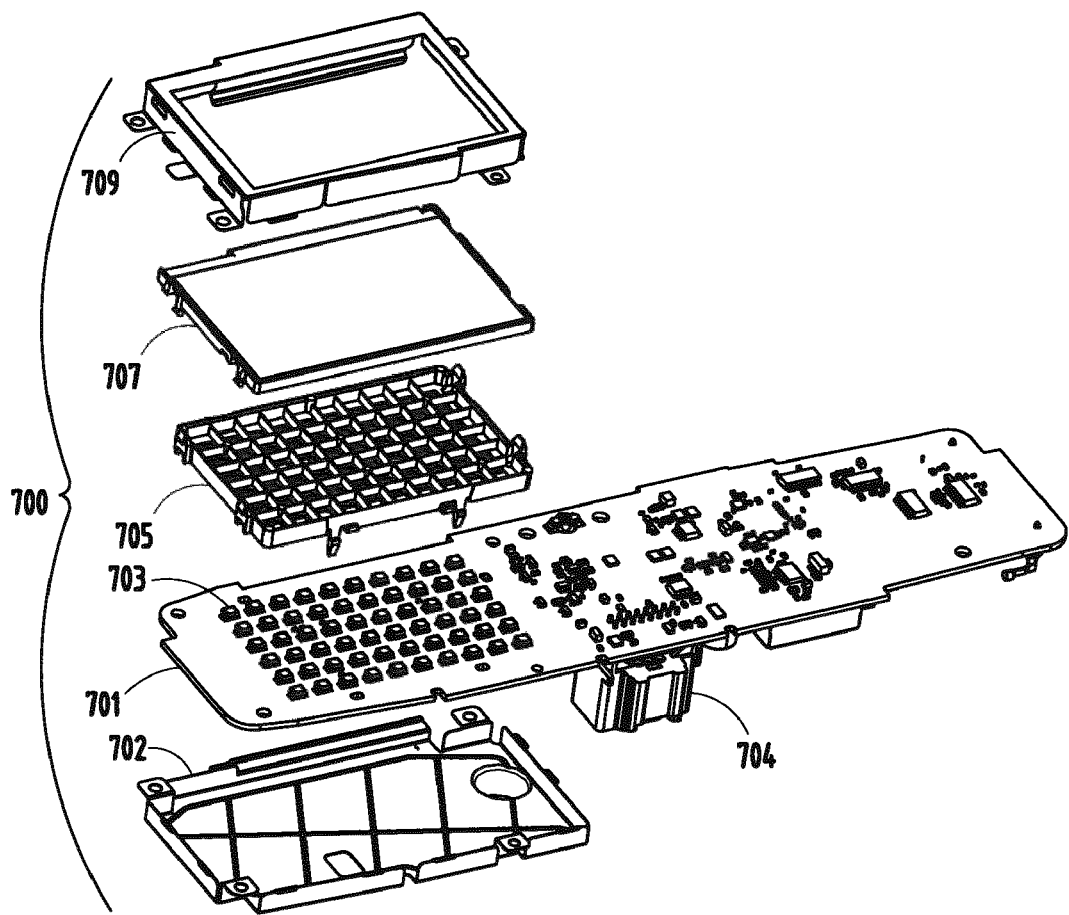
FIG. 7 is an exploded view of the LCD backlighting assembly in accordance with an embodiment of the invention.

FIG. 7 is an exploded view of the LCD backlighting assembly in accordance with an embodiment of the invention. As noted herein, the LCD backlighting assembly 700 includes a printed circuit board 701 having an array of LEDs 703 for providing backlighting. A back shield 702 is used for isolating electronic components on the lower side of the printed circuit board 701. Although shown as a 6×10 grid array of LEDs, the size and layout of the array can be tailored depending on the application, style, and/or type of LED as well as its operation in connection with the LCD 707. A reflector 705 is configured to fit over the LEDs 703 for projecting the maximum amount of light in a predetermined pattern. The reflector 705 is arranged such that each one of the LEDs in the array nests within a chamber created within the reflector 705 for providing maximum light projection for backlighting the LCD 707. The LCD 707 is positioned on top of the reflector 705 for providing an image to the driver, while the front shield 709 works to condition RF emissions that can be generated during operation of the LCD 707.

Figure 8:
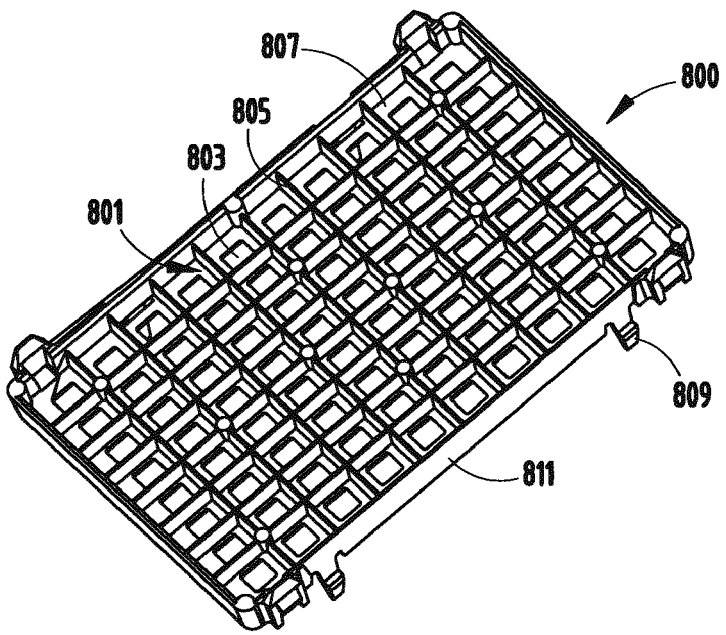
FIG. 8 is a perspective view of the reflector as shown in FIG. 6.

FIG. 8 is a perspective view of the reflector as shown in FIGS. 6A, 6B, and 7. The reflector 800 includes a matrix of reflective cavities 801, where each cavity includes an aperture 803 for allowing the radiating portion of an LED (not shown) to project into the cavity. Each cavity 801 includes sidewalls 805 and a rear wall 807 that are painted or clad with a highly reflective surface, such as chromium or the like, that works to reflect light in a forward direction outside each cavity 801. Although shown with substantially square sidewalls, it should be evident to those skilled in the art that the cavity may also be rounded and/or parabolically shaped. This allows the light from an individual LED to be projected to a specific location for backlighting the LCD. This arrangement reduces light scatter so that dark or "dead" spots can be created from non-uniform light projection during the backlighting process. The reflector 800 further includes one or more fastening clips that are extruded into the frame 811 that allows the reflector to be held into a rigid position with other components, such as a printed circuit board.

When in a fully assembled state, it is important that a good electrical connection be made between the front and rear RF shields and ground connections on the mirror so as to contain RF emissions provided by the LCD. In prior mirror designs, an electrical connection to an electro-chromic (EC) element used an electrical wire with a connector on each end of the wire to establish continuity to the circuit board and EC element. In many cases, the wire was soldered directly to the element bus bar used to provide power to various components on the printed circuit board. Although this type of wire and connector combination has low DC resistance, it also offers a high impedance to RF energy. On the side of the printed circuit board, a male connector is installed, such that a wire harness can be used to allow an operator to plug the wire harness into the circuit board and element bus bar. In use, if the wire harness was not carefully routed within the mirror housing when the operator installed the wire harness, the wire could become easily damaged. An example would be the wire getting in between a housing support rib and the circuit board, where it could be pinched that would eventually cause the wire to open or break continuity. In that the EC dimming mirror element includes conductive metal layers that are large enough so at radio frequencies (RF), these metal layers can be capacitively coupled to devices radiating RF energy. This would allow the EC mirror element to also operate as a passive radiator or antenna. Left ungrounded, this passive antenna can radiate RF energy created by a microprocessor and other electronics in the mirror assembly. This propagation of RF energy can cause the mirror to fail stringent RF emission requirements.

To eliminate the propagation or radiation of RF energy, the electrochromic dimming mirror element conductive metal layers must have a low impedance connection at radio frequencies to the mirror electronics ground. At radio frequencies, electrical energy travels on the surface of the conductor so a large surface area is required to minimize impedance. It would require a substantially large diameter wire for achieving a low enough impedance at radio frequencies. Due to size and weight of a large diameter wire, and the large connectors needed to match up to the larger wire, large wire is not practical to be used in a mirror housing. Instead, a wide strip of thin copper alloy or other metal can be soldered to the circuit board and the element bus bar for creating a low impedance connection at radio frequencies. However, a problem in this solution is that it is difficult to heat up a large piece of metal to an adequate temperature where it can be soldered. Moreover, once the wire is soldered in place, it is difficult to hold the wide strip of thin copper alloy or other metal in place long enough for the solder to cool without damaging or causing a "cold" solder joint.

Figure 9:
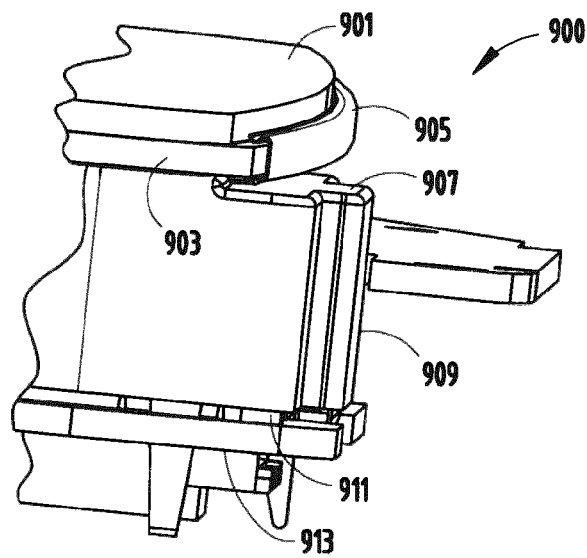
FIG. 9 is a side perspective view of a conductive elastomer pad as used in the automotive mirror assembly in accordance with an embodiment of the invention.
Figure 10:
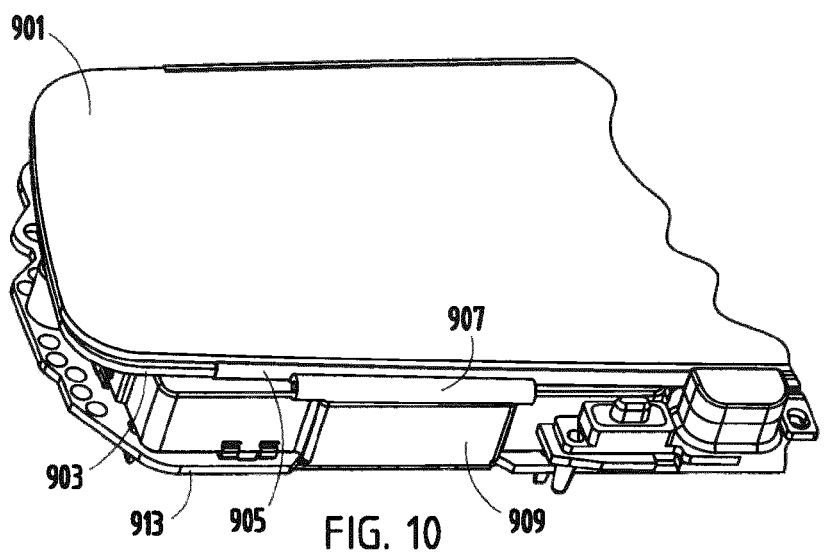
FIG. 10 is a top perspective view of the conductive elastomer pad as shown in FIG. 9.
Figure 11:
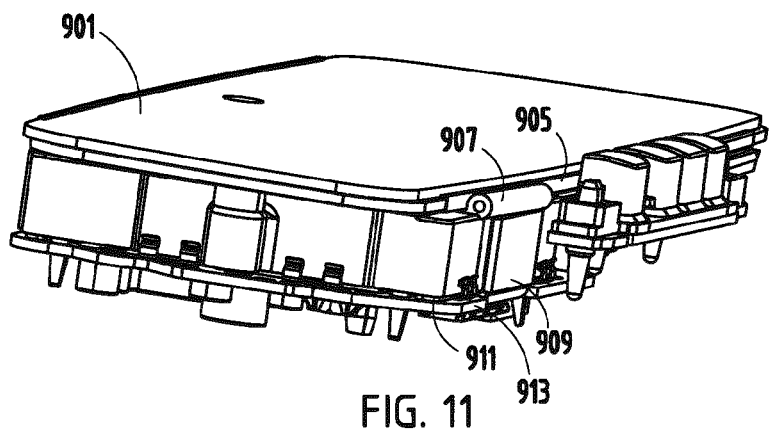
FIG. 11 is a magnified, side perspective view of the conductive elastomer pad as shown in FIG. 9.

FIGS. 9, 10, and 11 illustrate various views of the conductive elastomer pad used in accordance with an embodiment of the invention. FIG. 9 is a side perspective view of a conductive elastomer pad as used in the automotive mirror assembly. FIG. 10 is top perspective view of the conductive elastomer pad. FIG. 11 is a magnified side perspective view of the conductive elastomer pad as shown in FIG. 9. In order to provide a low resistance and impedance electrical connection at both direct current (DC) and at RF frequencies, the automotive mirror assembly illustrated in FIG. 9 utilizes a compressible conductive pad, such as a conductive elastomeric material or "elastomer," that can sandwiched between an EC element bus bar and a shield used for the LCD. As seen in FIGS. 9-11, the automotive mirror assembly 900 includes an EC element having a first substrate 901 and second substrate 903 where an element bus bar 905 is positioned between the first substrate 901 and second substrate 903 to supply electrical power to the EC element. In order to provide a low impedance grounding path at both DC and RF frequencies for preventing the EC element from becoming a passive antenna, a conductive elastomeric pad 907 is positioned to make electrical contact with the element bus bar 907 and LCD shield 909. Positioned under the LCD shield 909 is a PC board 913 that is used for mounting backlighting LEDs and other mechanical and electronic components (not shown). When in an assembled state, the PC board 913 provides a compressive force to the elastomeric pad 907 that is mounted upon a backer or support plate. This, in turn, allows the elastomeric pad 907 to connect to the bus bar 907. In operation, RF energy can be effectively shunted from the first substrate 901 and second substrate 903 of the EC element to the LCD shield 909. The LCD shield is electrically connected to a ground on the PC board 913 which prevents any microprocessor or flex cable (not shown) from coupling with the indium tin-oxide (ITO) coating used with the EC element and allowing it to act as a passive antenna.

The conductive elastomer pad 907 may be manufactured of a nickel graphite impregnated silicon elastomer or the like. One example of such a pad is manufactured by Laird Technologies Corporation, Model #8861-0100-93. The thickness of the pad will be determined by the distance or gap between the bus bar 905 and the LCD shield 909 as well as the amount of compression needed between these components. As is known by those skilled in the art, various materials can be used as fillers in the pad for enhancing its conductivity, such as Silver (Ag), Silver/Copper (Ag/Cu), Silver/Aluminum (Ag/AI), Silver/Nickel (Ag/Ni), Silver/Graphite (Ag/GI), Carbon (C), Nickel/Graphite (Ni/GI). A conductive adhesive can also be used to hold the conductive pad in place during the assembly process. Additionally, the conductive elastomer can also take the form of a conductive fabric applied over a compressible foam or a compressible elastomer, although a conductive fabric is generally not preferred over a conductive elastomer since they can corrode over time, limiting the conductivity of the material. Similarly, foam-like materials are also not preferred since they assume a "set-in" thickness at high temperatures causing a loss of compression.

The use of a conductive elastomer pad 907 for providing a low impedance RF ground in an automotive mirror assembly offers several distinct advantages, including a reduced need for a wire harness and connectors as well as an overall savings in manufacturing costs. Additionally, problems surrounding discontinuity from pinched wire grounds is also eliminated. During assembly, the elastomeric pad 907 can be installed in a variety of configurations allowing it to be mounted to the bus bar 905 or the LCD shield 909 during the final assembly process, thus providing a low impedance electrical connection at DC and RF between the circuit board and element and preventing the electrochromic element from becoming a passive antenna.

Figure 12:
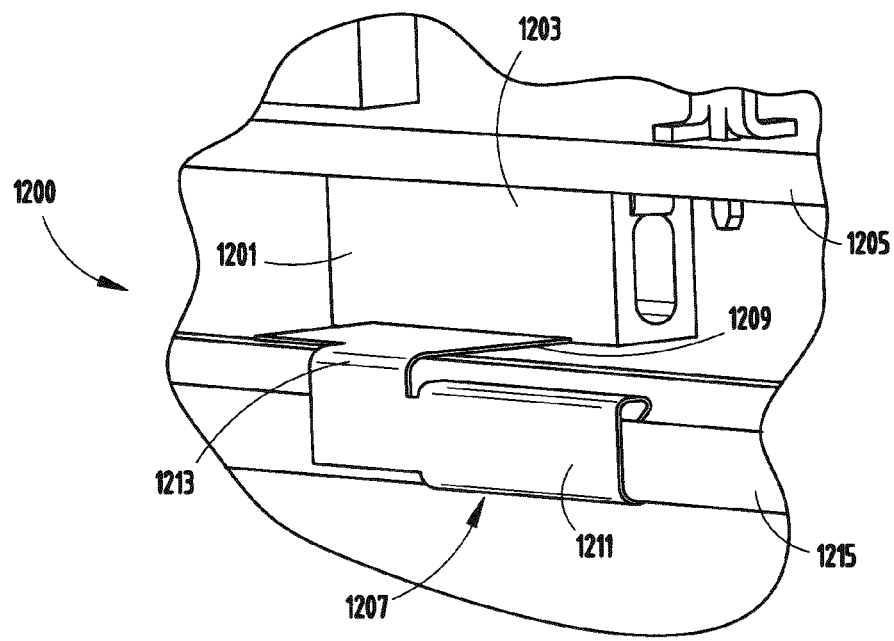
FIG. 12 is a magnified side view of a clip-on-clip in accordance with an alternative embodiment of the invention.

FIG. 12 is a magnified side view of a clip-on-clip assembly 1200 in accordance with an alternative embodiment of the invention. In this embodiment, the clip-on-clip assembly 1200 includes a compressible conductive pad 1201 that is a conductive silver-coated hollow silicone extrusion which is bonded and/or connected to a solderable, silver-plated metal support 1203. In contrast to the elastomeric pad 907, the compressible conductive pad 1201 can be soldered onto the side of the circuit board 1205 that faces the EC element (not shown). When the EC element and the PCB 1205 are in an assembled state, the front/rear housing of the mirror engages the compressible conductive pad 1201 that will be pressed onto a clip 1207 with a flat landing area 1209, that is snapped onto the element bus bar clip 1211 making an electrical connection from the circuit board 1205 to EC element. The bus bar clip 1211 that fits over the element bus bar clip includes a flat landing area 1213 with a conductive finish on the flat area for the compressible conductive pad to interface. Under some conditions, if the compressible conductive pad 1201 can make direct contact with the bus bar 1215 on the EC element, other embodiments may eliminate the flat landing area 1209. An advantage in using this type of compressible conductive pad 1201 is that the conductive pad 1201 will stand up to unintended abuse that occurs in normal handling of circuit board during the final assembly process. This occurs in view of the fact that the compressible pad 1201 has a much larger tolerance for misalignment, eliminating the chance of even subtle damage having an overall positive effect on long term durability.

Figure 13:
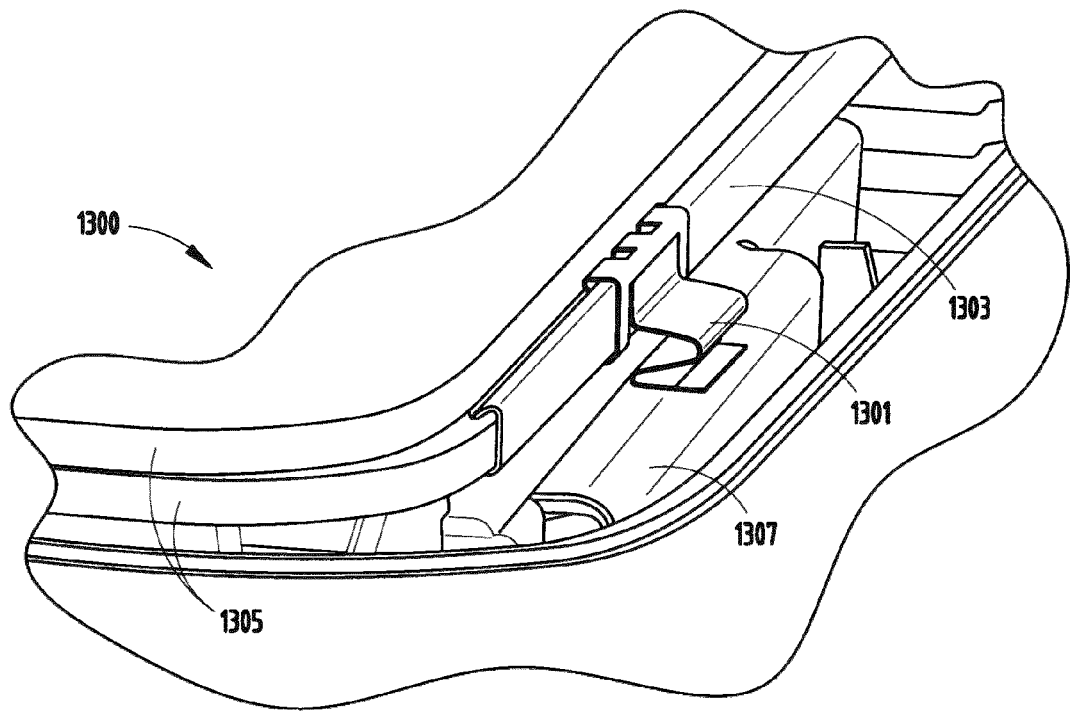
FIG. 13 is a magnified perspective view of a clip grounding assembly in accordance with another alternative embodiment of the invention.

FIG. 13 is a magnified perspective view of a clip grounding assembly 1300 in accordance with another alternative embodiment of the invention. The clip grounding assembly 1300 is used for providing a ground connection for DC and RF energy through the use of a "clip-on-clip" arrangement combined with a spring contact. The clip grounding assembly 1300 includes a bus bar clip 1301 that is frictionally engaged onto an edge of the bus bar 1303 of the EC element 1305. The bus bar clip 1301 clips onto the element bus bar 1303 and is pushed against a shield 1307 to make an electrical connection. As will be evident to those skilled in the art, the bus bar clip 1301 is S-shaped, providing some resilience when compressed. The bus bar clip 1301 can be made in a stepped-die out of strip metal stock in order to facilitate such resiliency. A connection interface surface can be plated with a conductive finish that does not corrode nor will it cause other impediments to conductivity for RF voltages. This part can easily be snapped onto the element bus bar by an operator. This embodiment will also provide a low impedance DC and RF electrical connection between the PCB and EC element that prevents the EC element from becoming a passive antenna.

Figure 14A:
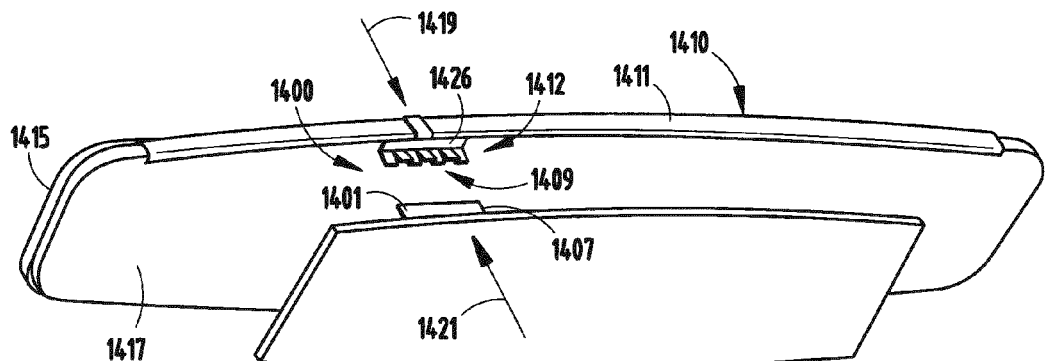
FIG. 14 is a perspective view of a clip for use in providing a low impedance ground connection in accordance with yet another embodiment of the invention.
Figure 14B:
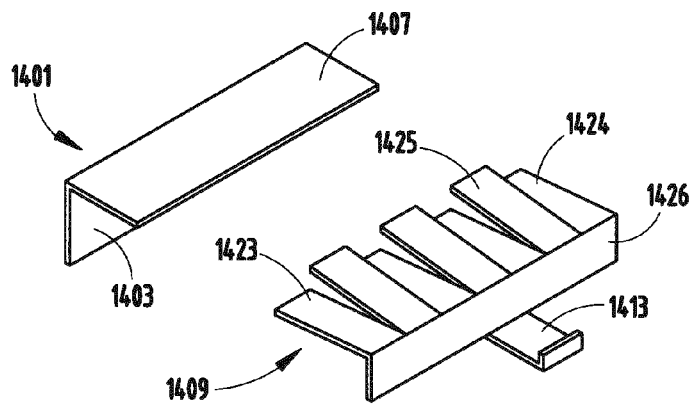
Figure 14C:
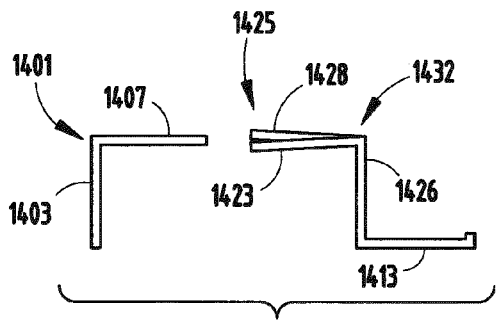
Figure 14D:
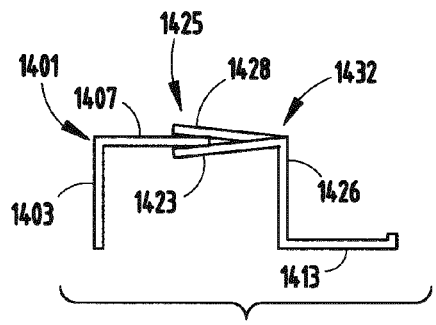

FIGS. 14A and 14B are perspective views of a clip 1400 used in providing a low impedance ground connection in accordance with yet another embodiment of the invention. FIGS. 14C and 14D are side views illustrating how the mirror and clip assembly, shown in FIG. 14B, is mated to provide a low impedance connection. Using this mirror and clip assembly 1400, a low impedance RF connection can also be made using metal formed contacts, e.g., using a stepped-die out of strip metal stock. FIG. 14A illustrates a mirror assembly and clip assembly 1400 incorporating an L-shaped conductor 1401 having a first portion 1403 connected to a PCB 1405 and a second portion 1407 configured to engage a connection device 1409.

As illustrated in FIG. 14A, the connection device 1409 is electrically connected with a bus bar 1411 using a flange 1413. The bus bar 1411 extends along mirror edge 1410. As described herein, the bus bar 1413 is used for providing electrical power to an EC reflective element 1412 comprised of a first substrate 1415 and second substrate 1417. As the reflective element 1412 is moved along line 1419 and the PCB 1405 is moved along line 1421, or only the reflective element 1412 is moved along line 1420, or only the circuit board 1405 is moved along line 1421, the L-shaped conductor 1401 will mate with preselected portions of the connection device 1409. The second portion 1407 of the L-shaped conductor 1401 mates by inserting its flat conductor between a plurality of first downwardly angled fingers 1423 and the plurality of second upwardly angled fingers 1425 connected by a side edge 1424 and rear edge 1426 as illustrated in FIG. 14B. When engaged, the L-shaped conductor 1401 frictionally engages so that it is pinched within the downwardly angled fingers 1423 and upwardly angled fingers 1425 to establish a firm electrical connection. As seen in FIGS. 14C and 14D, the fingers are in an open position 1428 and in a closed position 1430 as measured from edge 1432. It is contemplated that the L-shaped conductor 1401, downwardly angled fingers 1423, and upwardly angled fingers 1425 can include conductive finishes to assist in the connection. When properly mated, the mirror and clip assembly 1400 provides a low impedance DC and RF electrical connection between the circuit board 1405 and the reflective element 1412 for preventing the reflective element 1412 from becoming a passive antenna.

In situations where an alternative to connecting the shield to DC ground is required, i.e., between the bus bar and PCB, it may be necessary not to allow the negative terminal for the outdoor electrochromic (OEC) mirror to be changed from circuit ground. In this case, capacitors can be placed in series between the shield and circuit ground to provide a low RF impedance connection while isolating the shield from DC ground. Those skilled in the art will recognize that at each shield connection point, multiple capacitors can be used in parallel for allowing a low impedance path if multiple RF frequencies are to be shielded. Each capacitor has a self-resonant frequency where the capacitor achieves a very low RF impedance while blocking DC. The capacitance values can then be adjusted to achieve the best shield performance.

The LCD located in an auto-dimming rearview mirror has a great deal of functionality. For example, when used with a backup camera, the display shows a real-time panoramic view of the rear of the vehicle. The display appears through the mirror glass automatically when the vehicle is shifted into reverse. The display thus disappears when the vehicle is shifted into any other gear. This is only one application of the mirror display as it can be used for many other functions in order to provide vehicle information and a safer operating environment to the driver. Information displayed on the LCD can also be dynamically scaled in size so that it can fit only a certain area of the display. Thus, a full and/or complete rectangular picture does not always have to be shown with driver assist information. The display can be iconic or in a full graphic format.

The National Television Standards Committee (NTSC) provides a commonly utilized analog signal for communicating video information from an imaging device to a corresponding display. In at least one embodiment of the present invention, a video decoder, as available from Analog Devices, Inc., p/n ADV7180, is configured to receive at least one NTSC analog video signal and is connected to an LCD module, as available from Optrex Corporation, p/n T-55229GD035HU-T-AEN or p/n T-55195GD024H-T-AEN. In a related embodiment, the LCD module incorporates a LCD digital driver, as available from Himax Technologies, Inc., p/n HX8224-A01. In at least one embodiment, LCD voltage/signal timing is provided by the video decoder to an LCD module. In another embodiment, LCD voltage/signal timing is provided by the LCD digital driver to an LCD module. Related embodiments are particularly useful in vehicle rearview assemblies configured to receive an NTSC signal from an imaging device, for example, and display the content on an LCD. A related embodiment incorporates a graphical overlay, line(s) representative of a trajectory of a vehicle for example, embedded with a video, a scene rearward of a vehicle as received from an imaging device for example, within a single NTSC signal received by a video decoder. Corresponding overlay(s) may be generated within an imaging module or combined with a signal from an imaging device in a separate module to produce an NTSC signal ultimately received by the video decoder. In a preferred embodiment, a video decoder, an LCD digital driver, an LCD, a sub-combination thereof, or a combination thereof are provided within a vehicle rearview assembly housing. In an even more preferred embodiment, the video decoder, the LCD digital driver, the LCD, a sub-combination thereof, or a combination thereof are incorporated on a common printed circuit board. In at least one embodiment, at least a portion of this hardware is provided along with electro-optic mirror element drive circuitry and associated glare and/or ambient light sensing circuitry.

A video decoder, as available from Techwell, Inc., p/n TW8816, is connected to an LCD module, as available from Toshiba Matsushita Display Technology Co., Ltd, p/n LTA035B3J0F or p/n LT033CA25000. In a related embodiment, the LCD module incorporates LCD digital drivers, as available from Toshiba Corporation p/n JBT6LE0 (source) and p/n JBT6LB1 (gate). In at least one embodiment, LCD voltage/signal timing is provided by the video decoder to the LCD module. In at least one embodiment, a video decoder and a CAN bus interface are further connected to a microcontroller as available from Freescale, Inc., p/n 9S08AW48, from Renesas p/n R5F21207JFP, or from NEC p/n UPD70F3370A.

For example, in at least one embodiment, a sub-combination thereof, or a combination thereof is provided for display of desired content. These embodiments are particularly useful in vehicle rearview assemblies configured to receive an NTSC signal containing a video of a scene rearward of a vehicle as received from an imaging device, for example, internally generate overlay information and subsequently display the overlay information or combined content. A related embodiment incorporates static guidelines, dynamic guidelines, dynamic park assist, rear cross path alert, operational instructions (i.e., Homelink), and/or vehicle status information (i.e., compass heading, warnings, information, alerts, etc.), and/or driver assist features (i.e., lane departure warning, adaptive cruise control, headway monitoring, and control, etc.).

In at least one related embodiment, LCD backlighting is dependent upon the desired area of the LCD to be utilized. For example, with no video and only a graphic in a particular area of the LCD to be displayed, other backlighting associated with other portions of the LCD may be dimmed or turned off. In at least one embodiment, at least a portion of this hardware is provided along with electro-optic mirror element drive circuitry and associated glare and/or ambient light sensing circuitry. In a preferred embodiment, a video decoder, a LCD digital driver, a LCD, a microprocessor, a CAN transceiver, a sub-combination thereof or a combination thereof are provided within a vehicle rearview assembly housing.

In an even more preferred embodiment, a video decoder, a LCD digital driver, a LCD, a microprocessor, a CAN transceiver, a sub-combination thereof or a combination thereof are incorporated on a common printed circuit board. In at least one embodiment, at least a portion of this hardware is provided along with electro-optic mirror element drive circuitry and associated glare and/or ambient light sensing circuitry on a common printed circuit board.

A graphics processing unit (GPU), as available from Renesas p/n SH7264 or from Texas Instruments p/n TMS480G202, for example, is connected to an LCD module, as available from Toshiba Matsushita Display Technology Co., Ltd, p/n LTA035B3J0F or p/n LT033CA25000 or p/n LT033CA14000. In a related embodiment, the LCD module incorporates LCD digital drivers, as available from Toshiba Corporation p/n JBT6LE0 (source) and p/n JBT6LB1 (gate) or from Renesas p/n R61509. In at least one embodiment, LCD voltage/signal timing is provided by the LCD digital driver, a GPU or an external LCD timing controller.

In at least one embodiment, a video decoder, as available from Techwell, Inc., p/n TW8816, is connected to a GPU. In at least one embodiment, a GPU, a video decoder, and a CAN bus interface are further connected to a microcontroller as available from Freescale, Inc., p/n 9S08AW48, from Renesas p/n R5F21207JFP, or from NEC p/n UPD70F3370A, for example. In at least one embodiment, a sub-combination thereof, or a combination thereof is provided for display of desired content. These embodiments are particularly useful in vehicle rearview assemblies configured to receive an NTSC signal containing a video of a scene rearward of a vehicle as received from an imaging device, for example, internally generated graphical information as well as the subsequently displayed graphical information or combined content. A related embodiment incorporates static guidelines, dynamic guidelines, dynamic park assist, rear cross path alert, operational instructions (i.e., Homelink), and/or vehicle status information (i.e., compass heading, warnings, information, alerts, etc.), and/or driver assist features (i.e., lane departure warning, adaptive cruise control, headway monitoring, and control, etc.).

In at least one related embodiment, LCD backlighting is dependent upon the desired area of the LCD to be utilized. For example, with no video and only a graphic in a particular area of the LCD to be displayed, other backlighting associated with other portions of the LCD may be dimmed or turned off.

The LCD may be of a normally white construction, such that the absorption axis of the front and rear polarizers are 90 degrees apart, or more preferably normally black such that the absorption axis of the front and rear polarizers are parallel. In at least one embodiment, at least a portion of this hardware is provided along with electro-optic mirror element drive circuitry and associated glare and/or ambient light sensing circuitry. In a preferred embodiment, a video decoder, a LCD digital driver, a LCD, a microprocessor, a CAN transceiver, a GPU, a sub-combination thereof, or a combination thereof are provided within a vehicle rearview assembly housing.

In an even more preferred embodiment, a video decoder, an LCD digital driver, an LCD, a microprocessor, a CAN transceiver, a GPU, a sub-combination thereof, or a combination thereof are incorporated on a common printed circuit board. In at least one embodiment, at least a portion of this hardware is provided along with electro-optic mirror element drive circuitry and associated glare and/or ambient light sensing circuitry on a common printed circuit board.

A graphics processing unit (GPU), as available from Texas Instruments p/n DM6437, for example, is connected to an LCD module, as available from Toshiba Matsushita Display Technology Co., Ltd., p/n LTA035B3J0F, p/n LT033CA25000, or p/n LT033CA14000. In a related embodiment, the LCD module incorporates LCD digital drivers, as available from Toshiba Corporation p/n JBT6LE0 (source) and p/n JBT6LB1 (gate) or from Renesas p/n R61509. In at least one embodiment, LCD voltage/signal timing is provided by the LCD digital driver, a GPU, or an external LCD timing controller.

In at least one embodiment, a video decoder, as available from Techwell, Inc., p/n TW8816, is connected to a GPU. In at least one embodiment, a GPU, a video decoder, and a CAN bus interface are further connected to a microcontroller, as available from Freescale, Inc., p/n 9S08AW48, or from Renesas p/n R5F21207JFP, or from NEC p/n UPD70F3370A. In at least one embodiment, a sub-combination thereof, or a combination thereof is provided for display of desired content. These embodiments are particularly useful in vehicle rearview assemblies configured to receive one or more NTSC or digital video signals containing a video of a scene external to a vehicle as received from an imaging device, for example, internally generate graphical information, intelligently process image data and subsequently display the graphical information, image information, or combined content. A related embodiment incorporates static guidelines, dynamic guidelines, dynamic park assist, rear cross path alert, operational instructions (i.e., Homelink), and/or vehicle status information (i.e., compass heading, warnings, information, alerts, etc.), and/or driver assist features (i.e., lane departure warning, adaptive cruise control, headway monitoring, and control, etc.).

In at least one related embodiment, LCD backlighting is dependent upon the desired area of the LCD to be utilized. For example, with no video and only a graphic in a particular area of the LCD to be displayed, other backlighting associated with other portions of the LCD may be dimmed or turned off.

In at least one embodiment, at least a portion of this hardware is provided along with electro-optic mirror element drive circuitry and associated glare and/or ambient light sensing circuitry. In a preferred embodiment, a video decoder, an LCD digital driver, an LCD, a microprocessor, a CAN transceiver, a GPU, a sub-combination thereof, or a combination thereof are provided within a vehicle rearview assembly housing. In an even more preferred embodiment, a video decoder, an LCD digital driver, an LCD, a microprocessor, a CAN transceiver, a GPU, a sub-combination thereof, or a combination thereof are incorporated on a common printed circuit board. In at least one embodiment, at least a portion of this hardware is provided along with electro-optic mirror element drive circuitry and associated glare and/or ambient light sensing circuitry on a common printed circuit board.

In operation, at least two video signals can be derived individually from corresponding imaging devices. Related video processing apparatus is configured to provide a picture-in-picture display. In at least one related embodiment, the field of view of a first imaging device provides a relative wide field of view, while a second imaging device provides a narrow field of view. A rear vision system may incorporate additional sensor(s), such as ultrasonic sensor(s), to automatically display an image from the second imaging device within an image from the first imaging device when an object is detected by at least one ultrasonic sensor. Advanced Television Standards Committee (ATSC) provides a commonly utilized digital signal for communication of video information from an imaging device to a corresponding display. It should be understood by those skilled in the art that ATSC-compliant apparatus may be provided in at least one embodiment of the present invention. Incorporation of iPhone or Google phone functionality, including touch screen zoom/navigation, within a vehicle rearview assembly along with video and overlay display content as described herein is within the scope of the present invention. "Soft-keys" are depicted on a display in combination with physical operator interface buttons that may be positioned within the bezel, and are configured as "touch screen" devices. Any sub-combination thereof, or combination thereof, may be utilized to depict on the display a currently selected menu of items or selected information from a menu as desired. It should be understood by those skilled in the art that the physical operator interface(s) themselves may be used in addition to, or in lieu of, soft keys to provide desired functionality. In at least one embodiment, the operator interface is configured via a voice recognition system; a related assembly may comprise at least one microphone adapted to provide the corresponding functionality.

An operator interface may also be provided that allows the user to select the content of any given display and under which circumstances the specific content occurs. The owner may be given the ability to select from as many as four unique layers to be superimposed overtop a given video signal. In at least one embodiment, a picture-in-picture functionality may be provided. The content of the display may be configured to be a function of a park, reverse, neutral, drive, low (PRNDL) mechanism, or may be configured such that an owner may select the display content as a function of a number of vehicle inputs, such as reverse, drive, park, engine oil level, engine oil life, engine temperature, check engine, door ajar indicator, etc. Similarly, a nine sector grid pattern may be configured as part of a display when the vehicle is placed in reverse along with a video of a rearward facing scene. When the associated vehicle is equipped with additional sensor(s), such as sonar sensor(s) on the rear of the vehicle, the display may be configured to automatically include a graphic, such as a red triangle warning, within the content of the display when an object is detected.

In at least one embodiment, the location of the warning within the display may automatically appear within one of the nine sectors, for example, depending where a given object was detected by a corresponding sensor. It should be understood that any combination or sub-combination of video, text, and graphics may be incorporated within the content of any given display. In at least one embodiment of the present invention, a "blocked camera mode" may be indicated with a blue screen when a corresponding imaging device is detected to be unresponsive or providing an unacceptable image. A related embodiment may be adapted to function similarly with regard to indicating a failed imaging device.

It should be understood by those skilled in the art that additional inputs may also be provided to a rearview assembly in accordance with the present invention having additional operator interfaces, such as, buttons that are configured to provide a specific function if pressed continuously for a predetermined period of time, 5 seconds for example, or buttons that are configured to provide a specific function when temporarily pressed and released in a predetermined sequence. In embodiments that include such operator interface(s), a given button may have more than one function depending on predetermined event(s). Auxiliary inputs, such as ignition status and/or dash pushbutton(s), may be communicated via a vehicle information bus, such as a car area network (CAN). In at least one embodiment, a video decoder and/or application specific integrated circuit (ASIC) is provided with at least one CAN interface. It should be understood that in any given embodiment of the present invention, the content of a particular display may include video, static overlay(s), a series of static overlay(s) configured to appear dynamic, and/or dynamic overlay(s). Any given overlay may comprise alphabetical text, numerical text, straight lines, curved lines, tangential lines, sub-combinations thereof, or combinations thereof. For example, a particular display may contain a video of a rearward view of a vehicle as received from a corresponding imaging device along with a dynamic overlay that comprises line(s) that are a function of a steering wheel angle input pictorially representing a vehicle path. This display may only be active when a corresponding reverse is selected. Alternately, or in an alternate display, an overlay may comprise line(s) that are a function of ultrasonic sensor(s). In a preferred embodiment, the input(s), such as steering wheel angle, reverse select and ultrasonic sensor information, is obtained via a vehicle bus such as CAN bus.

In at least one embodiment of the present invention, an assembly is provided that includes overlay(s) having vector graphics that are, in and of themselves, dynamic, depending on the status of certain vehicle inputs, such as first responder (i.e., OnStar, Sync, etc.) activation; general maintenance reminders/reset instructions, such as oil and air filter; tire pressure warnings; engine coolant status; door ajar indicator; and the like. In at least one related embodiment, an assembly is provided wherein an original equipment manufacturer (OEM) and/or vehicle owner can write overlay(s) to memory language specific, comprise referred graphic content, comprise preferred text content, or the like. In at least one embodiment, the process of selecting a particular display or storing a new display into the assembly is independent of an algorithm utilized to control the intensity of a display and/or an electro-optic element. It should be understood that a touch screen display or a display along with operator interface(s) may be configured to enhance the human interface with a vehicle, such as, vehicle system operation, safety features, emergency contact systems, direction assistance, etc.

Further, the display assembly is provided that is configured to detect the presence of another device having its own display and to automatically mimic the content the device's display. This configuration is particularly useful for cellular telephones and the like equipped with Bluetooth technology providing a plethora of functionality, such as GPS, navigation, and internet access. A full navigation system may be provided with corresponding display and operator interface(s). In a related embodiment, a step-by-step text representation of directions to a desired destination is provided. In at least one related embodiment, an assembly is provided with a speaker for providing directions via audio means. The driver assist features provided to the driver through the LCD in the rearview mirror assembly includes, but are not limited to:

Lane Departure Warning

Figure 15:
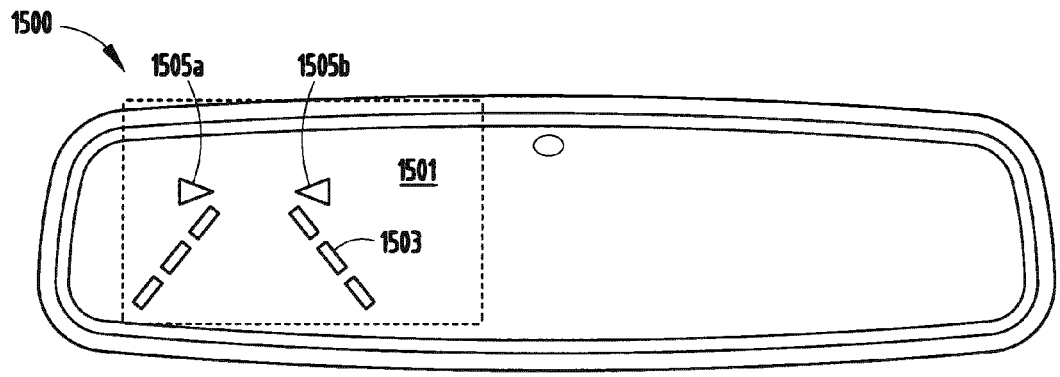
FIG. 15 is an illustration of the lane departure warning driver assist feature used in connection with a vehicular rearview mirror in accordance with an embodiment of the invention.

FIG. 15 is an illustration of a lane departure warning driver assist feature used in connection with a vehicular rearview mirror assembly in accordance with an embodiment of the invention. The display 1501 illustrates marking lines 1503 where carrots 1505a, 1505b are controlled by imaging technology to measure the distance between lane marking lines 1503 to determine when the vehicle is outside some predetermined lane boundaries. The lane detection driver assist feature detects road markings and provides the system with various measurements related to these markings. When implemented, the lane departure warning detection utilizes sophisticated image filtering techniques combined with detection and classification algorithms to detect a variety of lane markings. These markings can include, but are not limited to, solid lines, dashed lines, Bott's dots, and double lane markings. These marks must be detected under various weather conditions and road types, such as concrete and asphalt surfaces.

The technology can also identify both white and yellow lane markings, in daytime as well as nighttime conditions. Given that lane markings are visible, their detection is not hindered by the presence of clutter, i.e., shadows, rain, snow, or any other disturbance on the road. Typical lane detection algorithms can measure the distance from the vehicle's wheel to the lane markings as well as providing a more detailed description of the lane marking, for example, its width. Lane detection technology is typically based upon a three-parameter lane markings model that accounts for the marking's lateral position, slope, and curvature. The core lane detection technology can be used for various applications, principally lane departure warning, in which the driver is given a warning in the mirror display before unintentionally crossing a lane marking. The implementation can also be based upon the calculation of lateral speed of the vehicle with respect to the lane marking.

The warning mechanism can be tuned for sensitivity; for example, the system can warn only when the vehicle is actually crossing the lane marking, or it can give an early warning. The warning can be adapted to the type of road, for example, it could provide the driver with more slack in case of narrow roads or allow the driver to "cut" curves. Depending on the system interfaces, the display can provide the driver with various types of warnings for alerting the driver of an unintentional roadway departure or provide drowsy driver alerts by monitoring irregular driving patterns associated with drowsiness. Finally, a lane departure warning can also be delivered as a standalone application or as a feature in more extensive software applications used in connection with the mirror display. Examples of lane departure warning systems are described in U.S. Pat. Nos. 7,095,567, 7,206,697, and 7,038,577, which are herein incorporated by reference.

Adaptive Cruise Control

Figure 16:
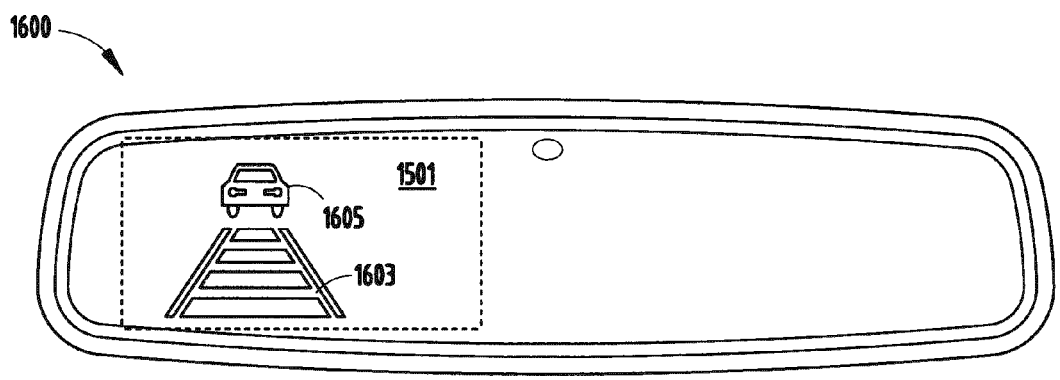
FIG. 16 is an illustration of the adaptive cruise driver assist feature used in connection with a vehicular rearview mirror in accordance with an embodiment of the invention.

FIG. 16 is an illustration of the adaptive cruise control driver assist feature 1600 used in connection with a vehicular rearview mirror assembly in accordance with an embodiment of the invention. In the illustration, a display 1601 illustrates a road 1603 used by the primary vehicle and a vehicle 1605 at some distance head of the primary vehicle. An Adaptive Cruise Control (ACC) system senses what is ahead of the vehicle, determines whether it is in the same lane, and varies the vehicle's speed to keep a safe following distance. Many ACC systems may use radar and laser technology, while others use multiple video cameras in a stereo-type arrangement. Advanced development on distance control for ACC systems based on a single camera may also be used. In all cases, the ACC system works to exploit or recover a depth map of the scene ahead of the vehicle in order to sense what is an "object," i.e., another vehicle, and what is simply part of the background. Pattern recognition technology works with the ACC system enabling it to make reliable and stable detections using single camera monocular processing.

In operation, detection range varies based on the field of view of the chosen camera. For example, a 50-degree lateral field of view provides a detection range starting from 90 m with a follow-through up to 120 m. The system locks to the object until the maximum range is exceeded (no minimal range constraints). Range and relative velocity estimations are performed to a level of accuracy sufficient for smooth vehicle control, despite the fact that the system is based on monocular processing. To that end, cues such as vehicle position relative to the roadway, retinal dimensions of the detected object, and retinal divergence (scale change) are employed in a way similar to what a human driver employs during a typical ride. In that the human visual system is capable of a depth disparity range on the order of few meters only, other cues are employed for actuation control of safe distance driving. The system detects the rear end of motorcycles and vehicles of all types and sizes under a wide variety of weather and illumination conditions. The system is invariant to traffic density, i.e., it performs equally well in highway or urban settings and can distinguish between static and moving targets.

Beyond target detection and range estimation, the ACC system follows the lane markings in order to lock on the "primary" target (the current vehicle in path) and senses cut-in movements (while employing visual motion processing) from neighboring vehicles. Cut-in indications are used for controlling cruise speed resumption in the ACC loop. The system is capable of fusing multiple sensory inputs, such as dual camera configuration, catering wide (approx. 50 degrees) and narrow (approx. 25 degrees) fields of view, allowing for extended maximum range estimations (150 m with follow-through to 200 m), all the while maintaining a wide lateral coverage of cut-in and target lock under twisty road conditions. This sequence illustrates the basic ACC functionality in city traffic. Targets can be marked by a bounding box where the color red might indicate "primary" target. The bounding box appears once the full rear of the vehicle is in the image. Cut-in indications are marked in text overlay when applicable. The system displays a "passing" indication (not shown) once the host vehicle is overtaken by a neighboring vehicle (issued via visual motion analysis) and passed onto the pattern recognition module for early detection of out-of-path targets. Those skilled in the art can appreciate that city traffic is especially challenging due to the high volume of irrelevant (clutter) background information. Examples of adaptive cruise control systems are described in U.S. Pat. Nos. 7,302,344, 7,324,043, and 7,368,714, which are herein incorporated by reference.

Headway Monitoring and Warning

Headway monitoring is similar to that shown in FIG. 16, in that drivers often maintain an insufficient distance between vehicles and other objects. This results in a major source of rear-end accidents. These accidents often occur since many drivers find it difficult to keep adequate headway distance because it requires taking into account both the distance to the vehicle ahead and the traveling speed of the driver's vehicle. The importance of keeping sufficient headway for reduction of accidents is recognized by traffic authorities worldwide and is being enforced in an increasing number of countries.

Headway is defined as the time it will take to reach the current position of a vehicle driving ahead, and is calculated by dividing the distance to the vehicle ahead with the travel speed of the host vehicle. Headway detection uses monocular vision for both vehicle detection and range measurement, and also applies lane analysis in order to measure road geometry and curvature to determine the CIPV (Closest In Path Vehicle). Headway measurement relies on the detection of the rear of the car in lit conditions and on detection of taillights in dark/night conditions. Headway monitoring can be provided via a numeric display or analog dial in the rearview mirror display to provide the driver with ongoing headway status, while the headway warnings can also be provided through graphic or audio alerts when the headway is insufficient. An example of Headway monitoring is shown in U.S. Pat. No. 6,002,983 which is herein incorporated by reference.

Forward Collision Warning System

Figure 17:
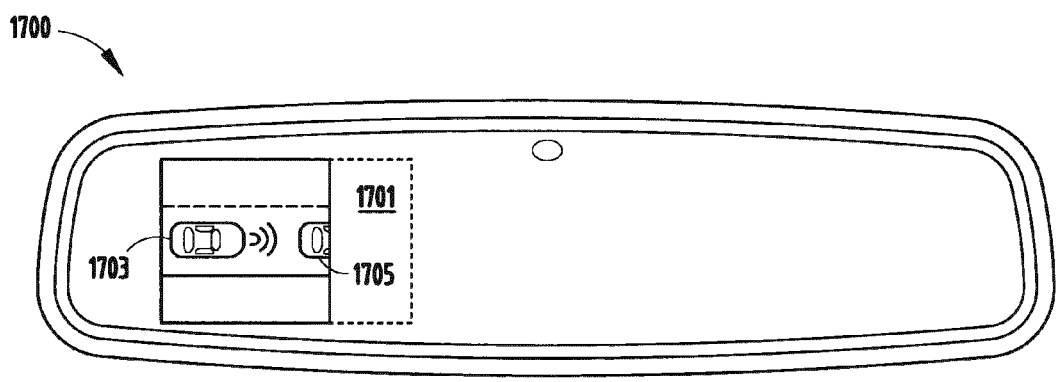
FIG. 17 is an illustration of the forward collision warning/emergency braking driver assist feature used in connection with a vehicular rearview mirror in accordance with an embodiment of the invention.

FIG. 17 is an illustration of the forward collision warning/emergency braking driver assist feature 1700 used in connection with a vehicular rearview mirror in accordance with an embodiment of the invention. The display 1701 illustrates the primary vehicle 1703 in a close proximity to target vehicle 1705 such that a warning is issued. The forward collision warning system detects situations where the vehicle would collide with another vehicle if no changes were made to the vehicle speed or direction. In this situation, the vehicle warns the driver by a visual indication on the LCD and/or a warning sound. If the time predicted to the collision is smaller than typical human reaction time, emergency braking is activated. In addition to vision-only solutions, such as the AWS (Advance Warning System), a forward collision warning system can provide active braking used in combination with radar. In the context of active braking applications, long range radar information is used for very accurate range and relative velocity measurements. The vehicle path and target vehicle boundaries are used to predict the probability of an accident. Radar sensors have many advantages, such as accurate measurement capability and resistance to poor weather conditions, but this application cannot be implemented using long range radar only.

In most cases, the radar system uses a single sensing modality operating at approximately 76 GHz to perceive its operating environment. This single sensor algorithm approach to perception problems, however, can lead to single mode failures. Although this radar is unaffected by weather and lighting conditions, sensor data from the radar is extremely limited in the context of trying to interpret an extremely complex and dynamic driving environment. In most cases, the combination of smart processing with radar data works well for the constrained application of ACC, but there are ACC situations where no matter how much processing is performed on the radar data, the data itself does not reflect the environment with a high enough fidelity to completely interpret the situation. Spatial resolution is relatively coarse for the detected field of view, such that detections can be improperly localized in the scene and object size very difficult to determine. The result is that small objects can appear large, radically different objects appear similar, and position localization is only grossly possible. This leaves room for improvement, which becomes important as the sensing technologies are applied toward safety features.

In order to implement the collision mitigation by braking, imaging is used to determine the object boundaries and classify the radar targets as vehicles or non-vehicles. The system is designed to reduce the effect of rear-end collisions or to avoid such collisions. Examples of forward collision warning systems are described in U.S. Pat. Nos. 7,302,344 and 7,050,908, which are herein incorporated by reference.

Emergency Braking

Similarly, rear-end impacts and collisions involving stationary vehicles are both common accident scenarios. In many such cases, the cause of the accident is driver distraction and failure to react in time to avoid impact. In these types of cases, an emergency braking system detects situations where the only means to prevent an accident is decelerating the vehicle. In the event the vehicle starts to autonomously brake, a warning sound and visual indication is provided to the driver in the display section of the vehicle's mirror, as shown in FIG. 17. In order to detect the pre-accident situation, long range radar information is used for very accurate range and relative speed measurements. The vehicle path and target vehicle boundaries are used to predict the probability of an accident. In order to implement the emergency braking, imaging is used to determine the object boundaries and classify the radar targets as vehicles or non-vehicles. Due to the fact that this is an application which autonomously brakes the vehicle, false braking interventions cannot be tolerated.

Driver Impairment Monitoring

Figure 18:
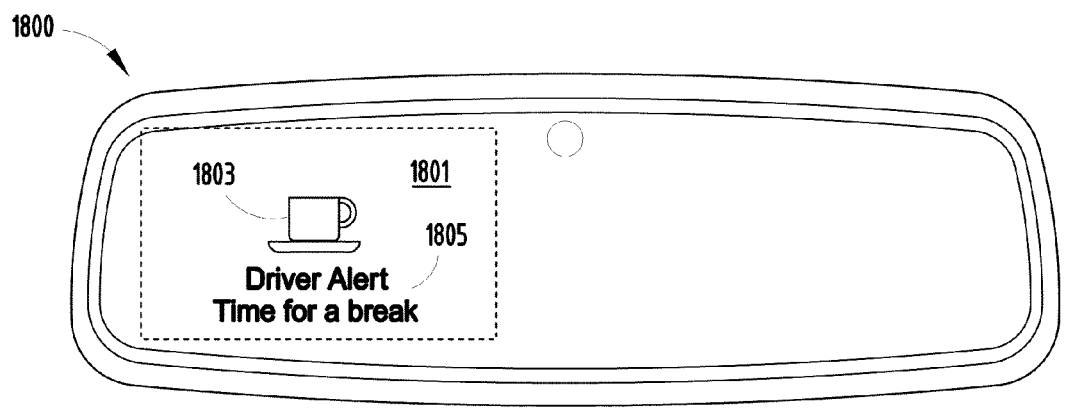
FIG. 18 is an illustration of the driver impairment driver assist feature used in connection with a vehicular rearview mirror in accordance with an embodiment of the invention.

FIG. 18 is an illustration of the driver impairment driver assist feature 1800 used in connection with a vehicular rearview mirror in accordance with an embodiment of the invention. The display 1801 illustrates both an iconic alert 1803 as well as a textual alert 1805 to inform the driver that it is time for a break from driving. No matter how safe the car is and how well the traffic situation can be controlled, safety is still always dependent on a human being. The driver must stay alert and make the right decision at all times. The system operates to sense if the driver is not at his or her best performance level due to fatigue or stress. For example, the driver impairment detector can alert the driver by analyzing the driver's driving parameters. The driving parameters might include things such as monitoring throttle movement, braking, steering angle, and even the use of indicators and wipers in combination with the vehicle's position relative to the lane markings and other cars on road. The behavior of other cars on the road and the driver's reaction to these conditions can also be indicative of whether the driver is alert. If the driver is deemed to be impaired, a warning sound and visual indication are given in the mirror display 1801, and the driver is advised to stop and rest. Examples of driver impairment monitoring systems are described in U.S. Pat. Nos. 7,227,472 and 7,245,231, which are herein incorporated by reference.

Traffic/Speed Sign Recognition

Figure 19:
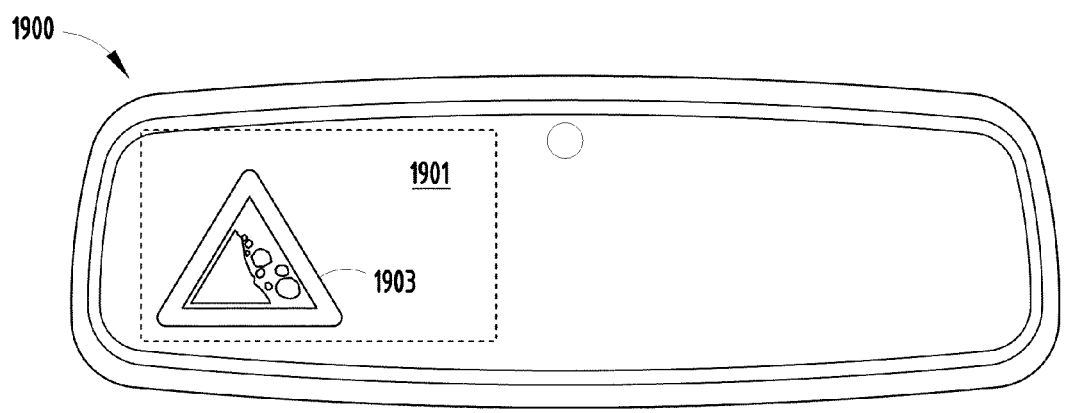
FIG. 19 is an illustration of the traffic sign recognition driver assist feature used in connection with a vehicular rearview mirror in accordance with an embodiment of the invention.

FIG. 19 is an illustration of the traffic sign recognition driver assist feature 1900 used in connection with a vehicular rearview mirror in accordance with an embodiment of the invention. The display 1901 illustrates the recognition of a falling rock hazard sign 1903 and indicates this sign to the driver in the rearview mirror display. The traffic/speed sign recognition application is a driver support function which can be used to notify and warn the driver which restrictions may be effective on the current stretch of road. Examples of such regulations are "speed limit zones" or "no-overtaking" indications. The system can help the driver to maintain a legal speed, obey local traffic instructions, or urban restrictions. The system will recognize and interprets various traffic signs using vision-only information and, therefore, signs which may be obscured by other vehicles or trees may not be recognized. In some platforms, the visual processing results can be integrated with vehicle navigation systems. Examples of traffic and speed sign recognition systems are described in U.S. Pat. Nos. 7,317,386 and 7,327,855, which are herein incorporated by reference.

Pedestrian Recognition

Figure 20:
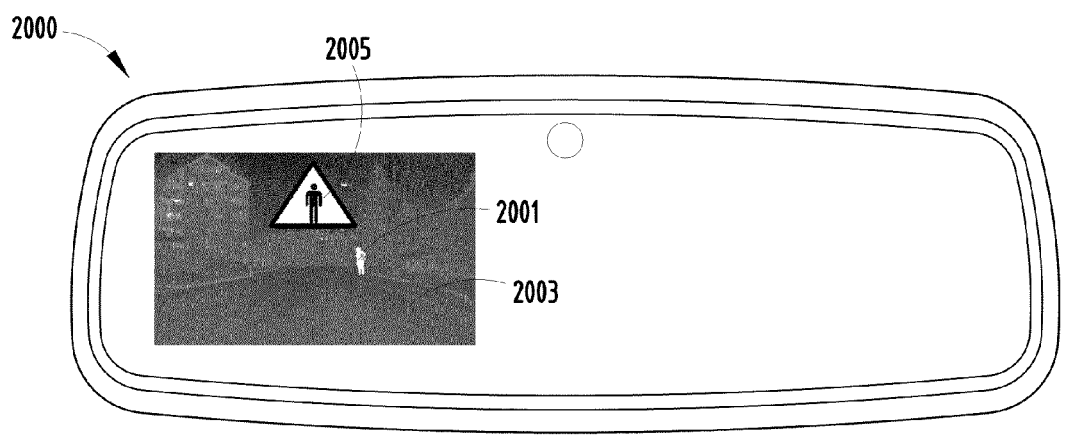
FIG. 20 is an illustration of pedestrian recognition and night vision driver assist feature used in connection with a vehicular rearview mirror in accordance with an embodiment of the invention.

FIG. 20 is an illustration of pedestrian recognition and night vision driver assist feature 2000 used in connection with a vehicular rearview mirror in accordance with an embodiment of the invention. The display 2000 illustrates the detection of a pedestrian 2001 and an iconic warning 2005 displayed to the driver on the rearview mirror. Pedestrians are the most vulnerable road users, whilst also being the most difficult to observe in both day and night conditions. Pedestrians in the vehicle path or walking into the vehicle path are in danger of being hit, causing severe injury both to the pedestrian and the vehicle's occupants. Pedestrian detection technology combines advanced pattern recognition and classifiers together with image processing and optic flow analysis to detect both static and moving pedestrians. Detection capabilities cover a wide range of applications in both day and night, for notification as well as for crash mitigation and active braking Pedestrian detection applications can be divided into many categories including, but not limited to, enhanced night vision, early warning systems for accident prevention, pre-crash systems for accident mitigation, emergency braking systems, close range, and low-speed blind spot pedestrian detection (rear-looking/side-looking cameras/360 degrees). Examples of lane departure warning systems are described in U.S. Pat. Nos. 7,331,415, 7,349,582, and 7,380,633, which are herein incorporated by reference.

Night Vision (Near/Far IR)

Similar to that shown in FIG. 20, night vision applications can serve both day and night scenarios for use by the driver. Visual processing modules used in connection with pedestrian recognition can also be adapted to accept infrared (IR) spectrums, rear and far. In some applications, such as pedestrian detection, the use of these IR spectra is imperative for matching the daytime performance and for extending detection range at night significantly. Far-IR sensors offer an advantage of target heat sensitivity without the need for active ambient illumination. The images of vehicles, pedestrians, and animals are significantly enhanced and are clearly visible under otherwise poor visibility conditions. When combined with visual processing, far-IR sensors can provide the same features as visible spectrum sensors while providing superior visibility to the driver.

Blind Spot/Lane Change

Figure 21:
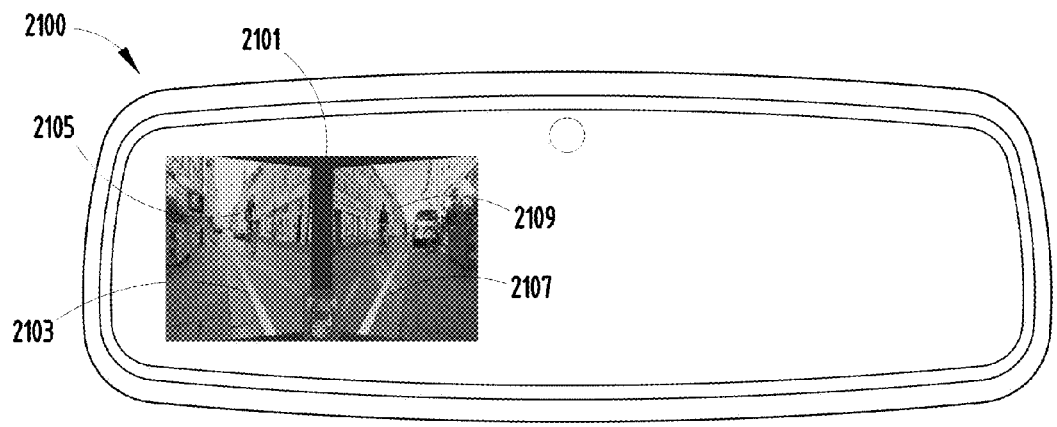
FIG. 21 is an illustration of the blind spot warning driver assist feature used in connection with a vehicular rearview mirror in accordance with an embodiment of the invention.

FIG. 21 is an illustration of the blind spot warning driver assist feature 2100 used in connection with a vehicular rearview mirror in accordance with an embodiment of the invention. The display 2101 works to provide an image for both the left and right side of the vehicle. In the illustration, the left side image 2103 shows a bicyclist 2105 in the vehicle's blind spot. Similarly, the right side image shows a bicyclist 2107 in the vehicle's blind spot. Thus, by mounting a camera on the side mirrors, the host vehicle's blind spot areas can be monitored that work to detect approaching vehicles and motorcycles from a distance of approximately 50 m. The combined analysis of the near and far areas as viewed from the side camera is geared toward indicating to the driver whether it is safe to change lanes. The blind spot area analysis is based primarily on visual motion and optic flow analysis. In other words, one would expect an outward flow of pixels in a normal situation; therefore, a violation of this assumption may indicate the presence of a foreign object in the blind spot area. Blind spot area analysis alone, however, may not be sufficient to protect the driver against a poor choice of a lane change maneuver.

Fast-approaching vehicles, starting from distances of approximately 50 m from the host vehicle, may pose a potential threat for a lane change as well. These approaching vehicles generate too small a retinal footprint to be reliably detected by means of visual motion alone. A pattern recognition module is, therefore, required to augment the optic flow processing and, moreover, a lane analysis module would be necessary as well. The lane analysis is required for determining whether an approaching vehicle is in a neighboring lane or one lane removed (thereby not posing a threat), or in the host vehicle's own lane for that matter (a question of relevance along a twisting road). Taken together, to achieve the desired functional specification, a system must employ almost all of the functional modules a forward-looking imaging system will contain, e.g., pattern recognition, motion, and lane analysis, but in a "reverse" viewing position. Examples of blind spot and lane change systems are described in U.S. Pat. Nos. 7,391,563 and 7,355,524, which are herein incorporated by reference.

Rear Camera Display (RCD)

Figure 22:
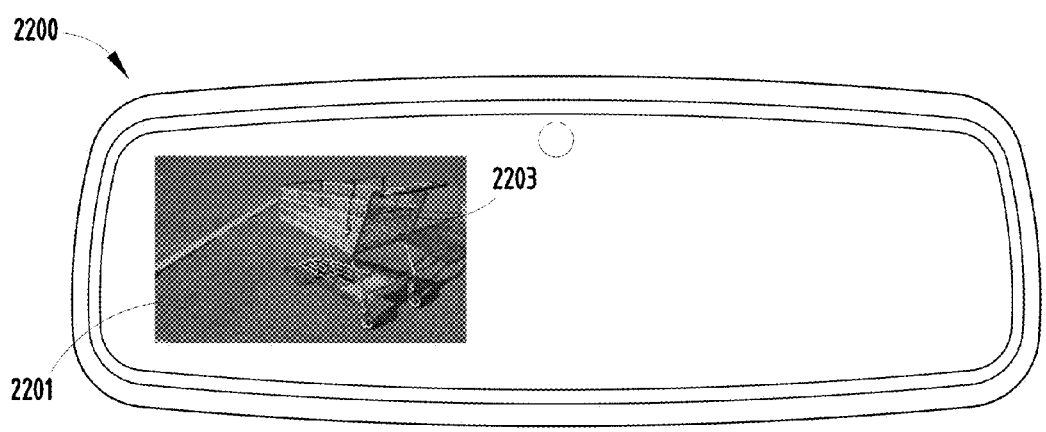
FIG. 22 is an illustration of a rear camera display driver assist feature used in connection with a vehicular rearview mirror in accordance with an embodiment of the invention.

FIG. 22 is an illustration of a rear camera display driver assist feature 2200 used in connection with a vehicular rearview mirror in accordance with an embodiment of the invention. The rearview mirror display 2201 illustrates a shopping cart 2202 located behind the vehicle. A camera mounted on the rear of the vehicle can also provide a number of important driver assistance functions displayed to the driver via the LCD located in the rearview mirror. As described herein, vehicle detection and pedestrian detection are applicable in the RCD and can also be used for other applications, such a collision migration, reverse obstacle warning, and pedestrian detection. Examples of such technology are illustrated in U.S. Pat. Nos. 7,327,226 and 7,379,814, which are herein incorporated by reference

Vision Range Estimation

Vision range estimation is the process of measuring distance to obstacles and their relative velocity. The main cue for determining the range from a monocular image is perspective. Perspective is noticed in the size of the vehicle in the image and in the location of the bottom of the vehicle (i.e., the location of the vehicle on the road plane). An adaptive combination method can be used that combines several visual cues, such as position on the road, road finding, size, and divergence (change of scale) to determine range, range rate, and time to contact. In use, an imaging sequence shows a comparison of range measurement to the vehicle ahead using vision and radar range measurement.

Figure 23:
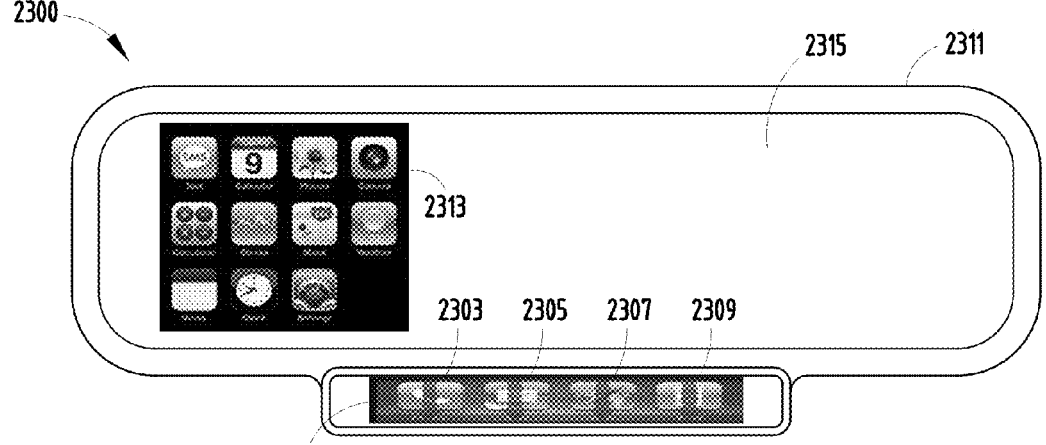
FIG. 23 is an illustration of a mirror using a reconfigurable button bar for providing additional functionality in accordance with an embodiment of the invention.

FIG. 23 is an illustration of a mirror using a reconfigurable button bar actuator 2300 for providing additional functionality in accordance with an embodiment of the invention. A reconfigurable button bar actuator 2300 includes at least one display 2301 that can be a portion of a main LCD display or used with a secondary LCD display. The reconfigurable button bar actuator 2300 is used to provide and display one or more touch sensors 2303, 2305, 2307 and 2309 that form the reconfigurable button bar 2300. The touch sensor may also employ any number of standard touch sensor technologies such as resistive touch, capacitive touch, surface acoustic wave, mechanically actuated silicone switch pad or the like. The reconfigurable button bar 2300 is typically positioned below the mirror bezel 2311 for easy access by the driver. In operation, the button bar 2300 allows a main display 2313 to be configurable so as to allow the driver to customize and/or control the information displayed on the main display 2313 in the mirror reflective area 2315. The button bar display 2301 employs standard technologies such as monochrome LCD, color LCD, OLED without the need for high intensity backlighting typically required for the main display 2313 placed behind the reflective surface. The button bar display 2301 operates to project the image of a button, switch or other control indicia for aiding the driver in controlling operation and functionality of the main display 2313. This type of control is particularly useful in the use of driver assist features as described herein.

Optionally, an IR sensor may used in connection with the touch sensors 2303, 2305, 2307 and 2309 allowing the driver's finger or other object to actuate the switch when placed in the path of an IR beam used with the sensor. In use, a graphical representation of a button as used within the button bar display 2301 such that a light sensor is triggered that indicates that the button has been selected. This allows these reconfigurable set of buttons to be presented to the driver according to the current menu options or other relevant vehicle conditions without leaving fingerprints, smudges or other residue in the reflective area of the mirror 2315. The touch sensor may also employ any number of standard touch sensor technologies such as resistive touch, capacitive touch . . . etc. The main display 2313 can cover a portion of the reflective area or optionally the entire reflective area. The display 2313 and icons displayed therein may be scalable in size depending on an emergency, urgency of an event and/or driver preference. The button bar display 2301 and button bar display 2313 may employ the same display substrate while having two zones separated by the bezel and having LED backlights of differing intensities.

Figure 24A:
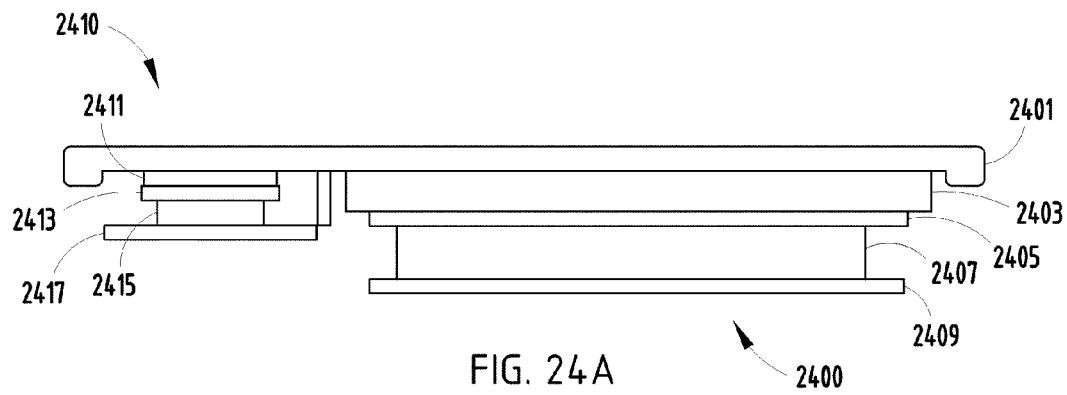
FIGS. 24A, 24B, and 24C illustrate cross-sectional views of various embodiments of the reconfigurable button bar shown in FIG. 23.
Figure 24B:
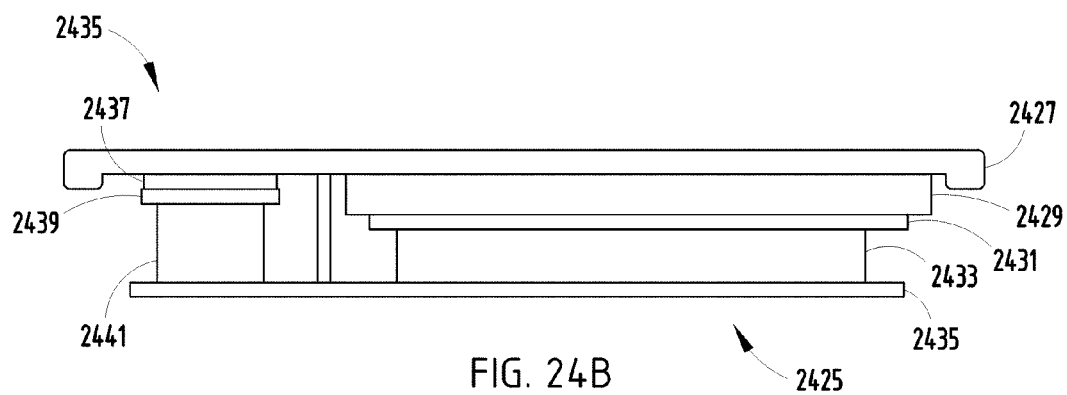
Figure 24C:
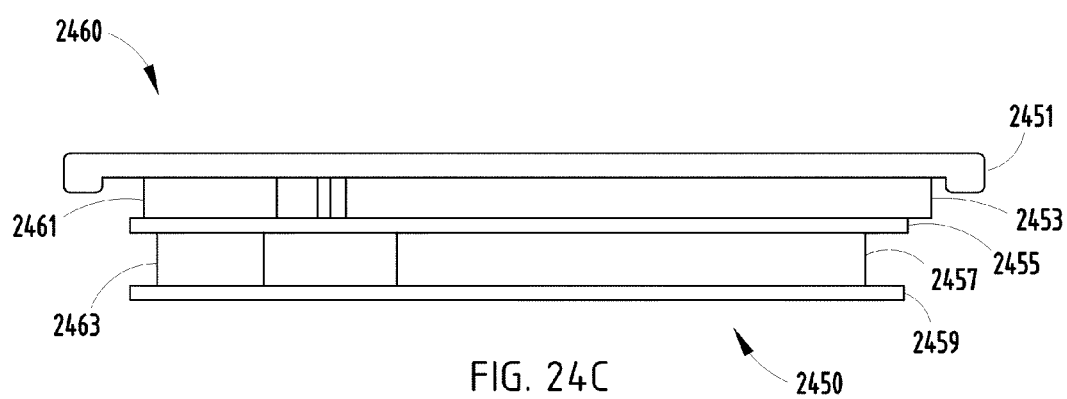

FIGS. 24A, 24B and 24C illustrate cross-sectional views of various embodiments of the reconfigurable button bar shown in FIG. 23. FIG. 24A shows a cross-sectional view of the reconfigurable button bar assembly 2400 where a bezel 2401, EC glass element 2403, main LCD 2405 and main LCD backlight 2407 are mounted on a main PCB 2409. In this embodiment, each of the components of the reconfigurable button bar 2410 are separated from main display so that the touch panel 2411, button LCD 2413 and a button LCD backlight 2417 are each mounted to a button PCB 2415 that is separate and apart from that of the main PCB 2409. The only element is shared between the main display and the button bar display is the bezel 2401. As described herein the reconfigurable button bar assembly 2400 works to allow the driver to control and access various driver assist functions in the main LCD 2405 without leaving fingerprints or other residue on the EC glass element 2403.

FIG. 24B illustrates an alternative embodiment of the reconfigurable button bar assembly 2425 where both the main display and button bar display share a common PCB. A bezel 2427, EC glass element 2429, main LCD backlight 2431 are each mounted to a main PCB 2433 and work to provide a main display behind the EC glass 2429. The reconfigurable button bar 2435 includes a touch panel 2437, a button LCD 2439 and a button LCD backlight that are mounted to the common PCB 2433. As described herein, the button bar is used display buttons or other control information to the driver, allowing them to actuate various driver assist functions on the main LCD 2431 without leaving fingerprints or other residue on the EC glass element 2429.

Finally, FIG. 24C illustrates still another alternative embodiment of the reconfigurable button bar assembly wherein both the main display and the button bar display share both a common PCB and LCD. The reconfigurable button bar assembly 2450 includes a bezel 2451, an EC glass element 2453, main LCD 2455, main LCD backlight 2457, all mounted to a main PCB 2459. The reconfigurable button bar 2460 includes a touch panel 2461 and a button LCD backlight 2463 that are mounted to the main PCB 2459. In this embodiment, the main LCD 2455 extends over to the reconfigurable button bar 2460 under the touch panel 2461. This configuration allows the reconfigurable button bar 2460 to share the main LCD 2455 without having its own LCD as seen in FIGS. 24A and 24B. As with the other embodiments, the reconfigurable button bar assembly 2450 allows the driver to select various driver assist functions on the main LCD 2455 without leaving fingerprints or other residue on the EC glass element 2453.

Figure 25:
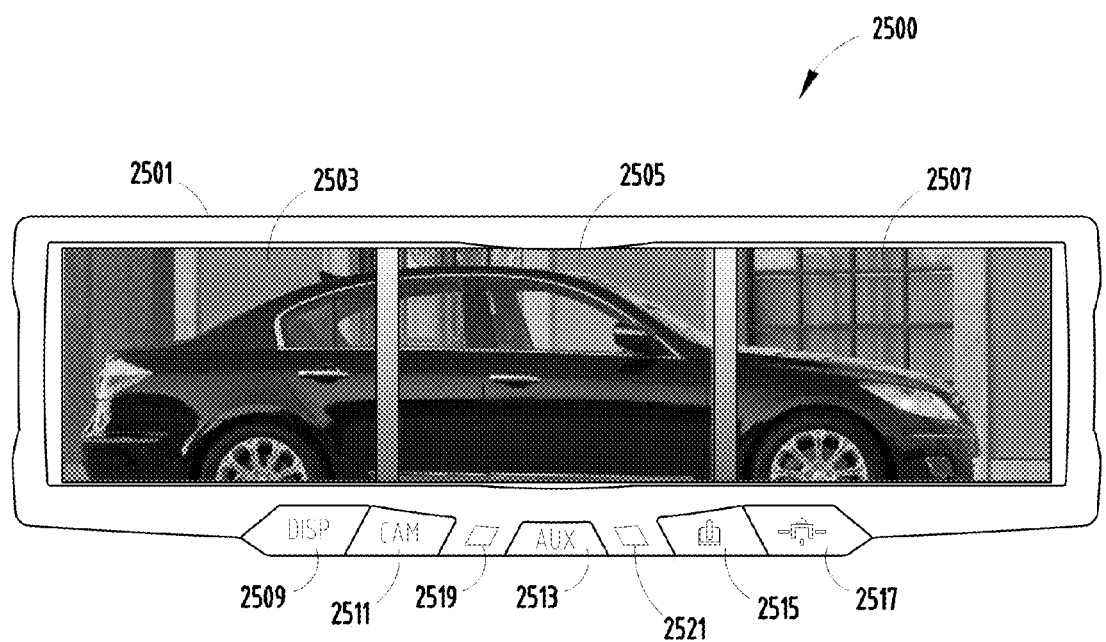
FIG. 25 is a front view of an automotive mirror assembly having multiple displays.

FIG. 25 illustrates a multi-display mirror in accordance with an alternative embodiment of the invention. The multi-display mirror 2500 includes a bezel 2501 that surrounds first display 2503, second display 2505 and third display 2507. The first display 2503, second display 2505 and third display are aligned so that one or more images may be aligned, jointed or "tiled" across one of more of the displays. Push-button switches 2509, 2511, 2513, 2515 and 2517 work in combination with LED enunciator lamps 2519, 2521 to control functional aspects of the software used to operate and control the multi-display mirror 2500.

Figure 26:
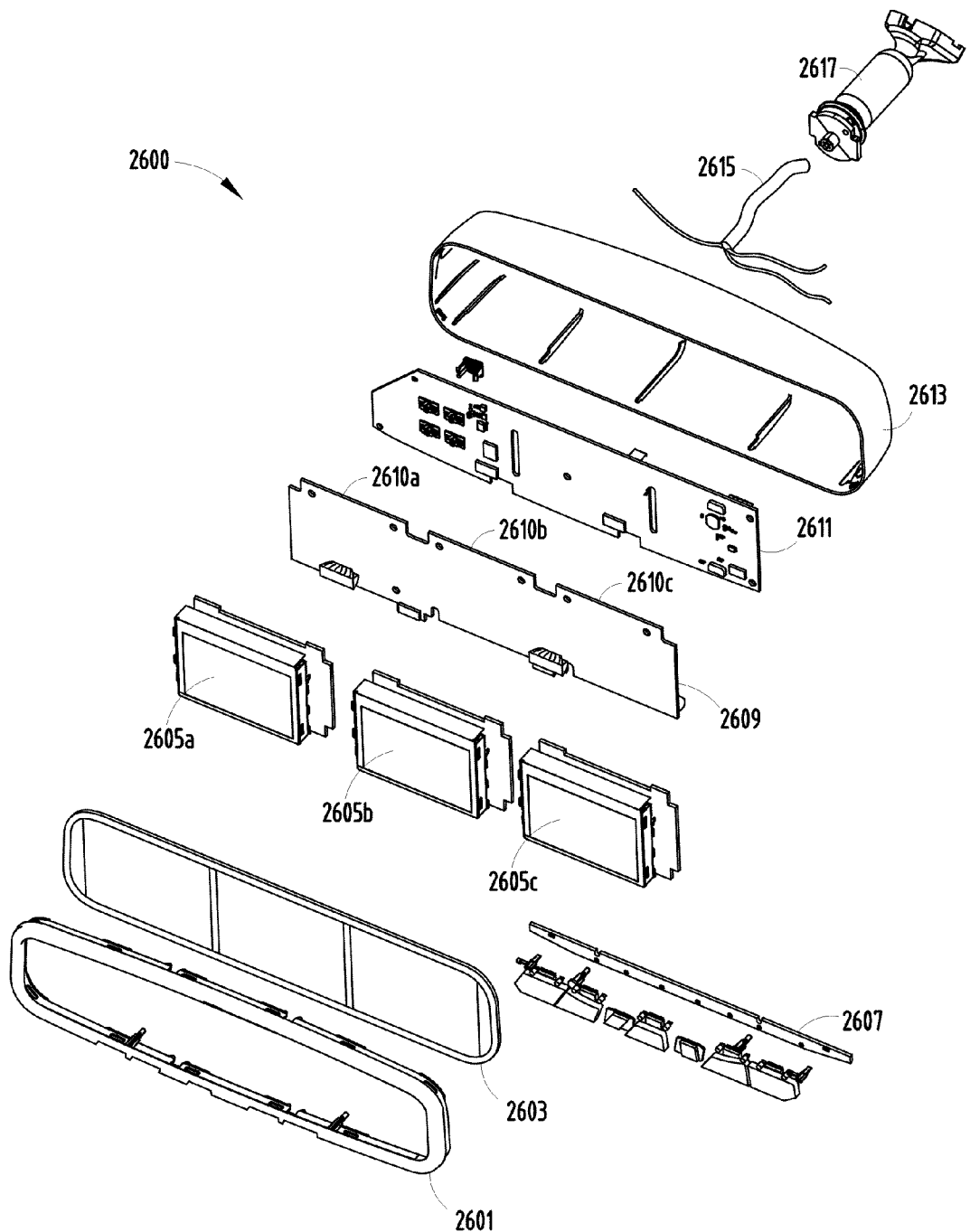
FIG. 26 is a top exploded view of the automotive mirror assembly shown in FIG. 25.

FIG. 26 is a top exploded view of the automotive mirror assembly shown in FIG. 25. The automotive mirror assembly 2600 includes a bezel 2601 that is used to surround the perimeter of an electrochromic (EC) glass element 2603. As is well known in the art, the EC glass element 2603 operates to electronically control the reflectivity of the mirror element so as to reduce headlight and other nuisance reflections encountered by the driver in twilight and dark environments. A plurality of liquid crystal displays (LCDs), namely a first LCD 2605A, a second LCD 2605B and a third LCD 2605C are positioned behind the EC mirror element 2603 and operate to provide additional video information to the driver while the vehicle is in operation. A switch assembly 2607 includes both a plurality of switches and a printed circuit board (PCB) positioned beneath the EC glass element 2603 so that a first LCD 2605A, second LCD 2605B and third LCD 2605C may be controlled through the appropriate apertures formed within the bezel 2601. As seen in FIG. 26, each of the first LCD 2605A, second LCD 2605B and third LCD 2605C include a respective PCB that is mounted behind each LCD that operates to supply an operating voltage and the respective electrical connections for providing data and other information to each respective LCD.

The automotive mirror assembly 2600 further includes a light emitting diode (LED) backlighting board 2609 mounted behind each of the first LCD 2605A, second LCD 2605B and third LCD 2605C. The LCD board 2609 includes a plurality of LEDs mounted on the board (not shown) that work to provide back light illumination for each respective LCD element. Although many different variations in LED arrangement and size are possible, by way of example and not limitation, a matrix type array of fifteen LEDs are used to provide adequate background illumination for each LCD element. Further, a main PCB 2611 is mounted behind the LED board 2609 and is used to mount electrical components for controlling mirror operation. As best described in FIG. 27 hereinafter, the main PCB 2611 may include such components as the EC mirror drive and sense circuitry, microprocessor, and memory elements for controlling operation of the automotive mirror assembly 2600. Finally, a mirror housing 2613 is used to house each of the various mirror components within a cavity formed within the housing 2613. A control cable 2615 is routed to the rear of the housing 2613 for providing power, data and other control information to the mirror's electronic components. A mirror mount 2617 is used in combination with the housing 2613 for mounting the automotive mirror assembly 2600 into a fixed position to the automobile windshield (not shown).

Figure 27:
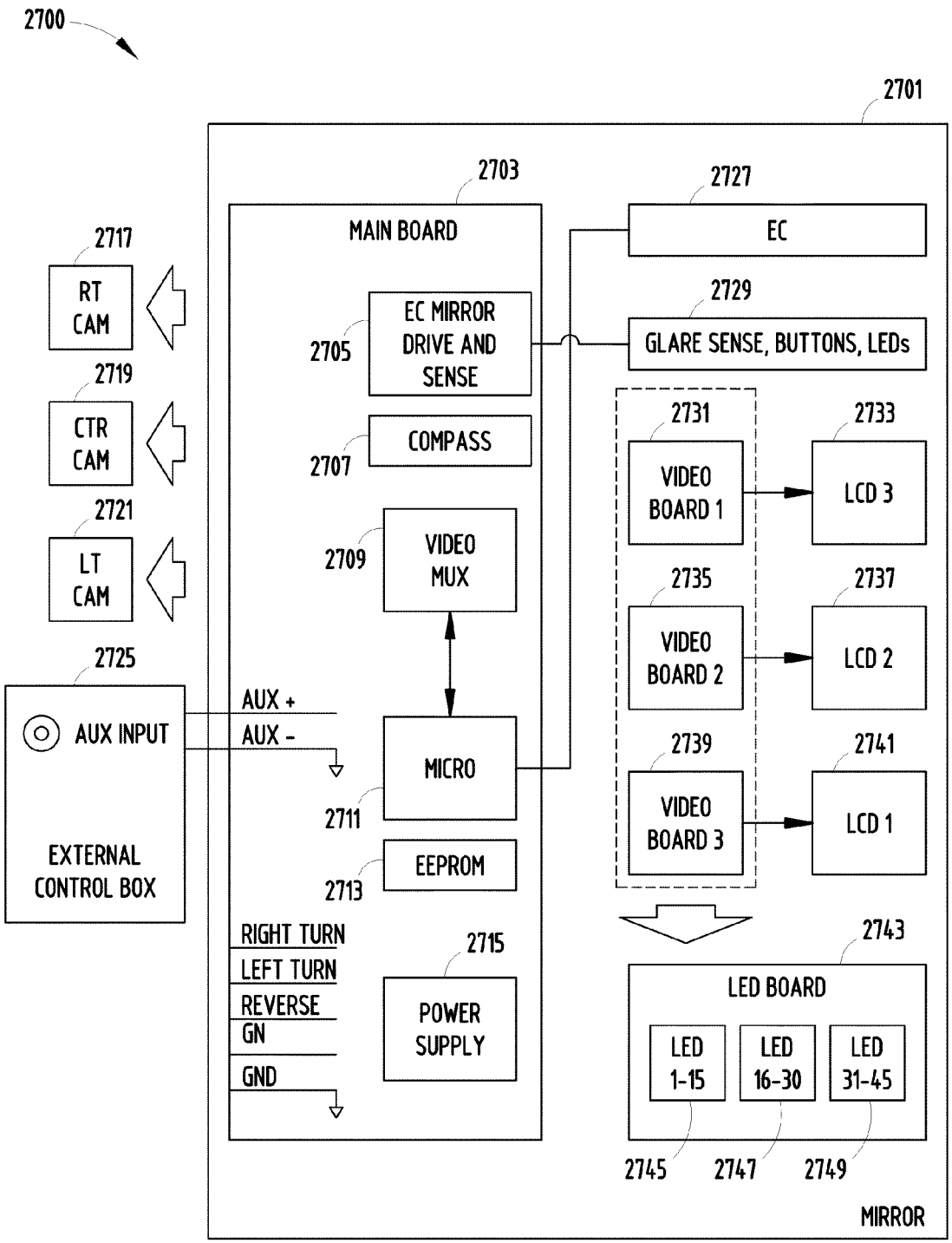
FIG. 27 is a block diagram illustrating the system configuration of the multi-display mirror shown in FIG. 25.

FIG. 27 is a block diagram illustrating the system configuration of the multi-display mirror shown in FIG. 25. The multi-display mirror 2700 includes a mirror housing 2701 that is used to contain or house a number of electrical components for controlling operation of the automotive mirror assembly. A main circuit board 2703 (as shown by PCB 2611 in FIG. 26) includes an EC mirror drive and sense circuit that is controlled by a plurality of glare sense buttons and LEDs 2729 for controlling operation of the EC mirror element. The main board 2703 also includes a compass 2705 for indicating a magnetic bearing of the vehicle to the driver. A video multiplexer 2709 and microprocessor 2711 are used in combination with an EEPROM memory 2713 for controlling operation of the EC element 2727 as well as a plurality of cameras mounted outside the vehicle. These cameras include right camera 2717, center camera 2719 and left camera 2721 mounted about the vehicle for providing video information on one or more of the associated LCDs mounted in the automotive mirror assembly 2700. Preferably, the cameras include a multi-view feature such that the output image can be dynamically modified based on command inputs from the main board. Multi-view features such as digital zoom and split view, as is commonplace for such cameras, are preferred whereby the output video signal represents one or more portions of the total image obtained by the camera sensor.

In operation, each LCD is operated by a respective video board for supplying both power and data to the LCD. For example, video board 2731 operates with LCD 2733, video board 2735 operates in combination with LCD 2737, and video board 2739 operates in combination with LCD 2741. Video boards 2731, 2735, and 2739 each include a video decoder within which is contained a video scaler whose operation is described herein. As described in relation to FIG. 26, an LED board 2743 (LED board 2609) is used in combination with a number of LED arrays, namely, LED array 2745, LED array 2747 and LED array 2749 for providing backlighting to the various LCDs 2733, 2737 and 2741. Although the LED board 2743 is shown using arrays consisting of fifteen LEDs for each LCD, it will be evident to those skilled in the art that a greater or lesser number of LEDs may be used in the array for providing an adequate amount of background lighting.

Typical cameras used in vehicle applications employ wide angle lenses with a viewing angle of 180 degrees or more. Connecting three cameras to three adjacent displays where each camera has a 180 degree viewing angle results in an overall rear view image that may be distracting while the vehicle is in motion. For example, with three cameras arranged as in the present embodiment, all with a 180 degree viewing angle, an object in the rear view can potentially appear in different positions in all three displays. Further, when the vehicle is moving, this same object may appear to move at differing rates within each display based on the camera viewing direction and lens curvature. Those skilled in the art will appreciate how an image of this type, presented to a driver, contrasts with the typical view presented by a reflective glass center mounted mirror. Consequently, the preferred embodiment includes adjustments to the image obtained from the cameras for scaling and/or optimizing the view presented to the driver. Further, the preferred embodiment includes a set of automatic viewing modes which are also optimized to certain driving conditions.

Figure 30:
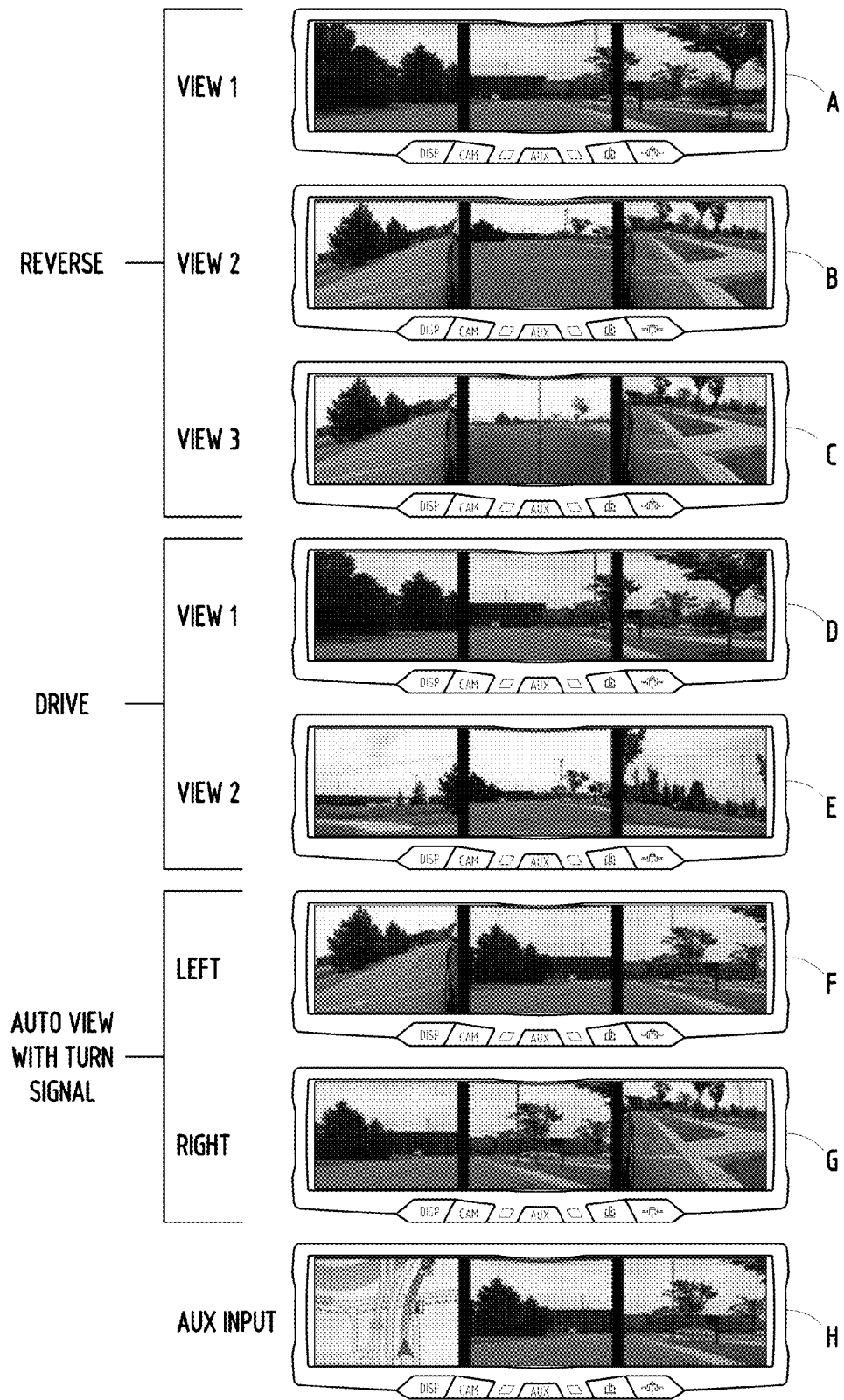
FIG. 30A to 30H illustrate views of the multi-display mirror showing operation of the various display modes.

FIGS. 30A-H illustrate views of the multi-display mirror showing operation of the various display modes. More specifically, FIGS. 30A, 30B and 30C illustrate various views of the multi-display mirror system when the vehicle typically is operating in a reverse direction. FIG. 30A illustrates a panoramic view of the rear scene where a portion of the camera image is "cropped" so as to limit distraction to the driver. In the image in FIG. 30A, the top and bottom third ($\frac{1}{3}$) of the total camera image are cropped within the camera and subsequently expanded vertically and linearly by the camera prior to or in combination with the encoding of the final image into an electrically transmittable video signal such as an NTSC video signal. If the output from the rear camera in the present mode were presented on a single display, objects in the camera view would appear abnormally oblong in the vertical direction reflecting the two thirds ($\frac{2}{3}$) cropping and subsequent three times (3×) vertical stretching.

However, when the camera image is tiled across three adjacent displays of equal size and aspect ratio, objects in the camera return to normal proportions. The tiling function is preferably implemented using the scaling function of the video decoder. The scaling function employs a simple line buffer to expand and interpolate incoming video signals to fill the available pixels of the LCD. The left display samples the incoming video signal for approximately the first third ($\frac{1}{3}$) of each line of video and subsequently scales the sampled data to fill the entire line of pixels within the left LCD. Likewise, the center display samples the incoming video signal for approximately the center third ($\frac{1}{3}$) of each line of video and subsequently scales the sampled data to fill the entire line of pixels within the center LCD. Lastly, the right display samples the incoming video signal for approximately the last $\frac{1}{3}$ of each line of video and subsequently scales the sampled data to fill the entire line of pixels within the right LCD. Minor adjustments in the sampling are made to account for the gaps between the displays to ensure a straight line can be presented across multiple displays. The horizontal scaling of video is implemented by selecting a beginning and ending point within the video line through software commands sent to the video decoder.

Thus, FIG. 30A illustrates cropping and stretching of the camera working in concert with the scaling of the video decoders to present a panoramic image to the driver with proportions that are substantially normal. Further, FIG. 30A illustrates an image presented to the driver in video form that is similar in proportion and perspective to an image visible from a center mounted mirror. The present invention employs a transflective electro-chromic element in front of the three displays such that the displays are visible when activated by transmitting light through the element and substantially unobservable when not activated so as to function as is typical for an electro-chromic mirror. As such, FIG. 30A depicts a video image when the displays are activated which is substantially similar to the reflected image when the displays are not activated. The advantage of such a system is evident in low ambient light situations where camera sensitivity to infrared light produced by rear facing lights of the vehicle is much higher than that of the human eye. Also, such a system could compensate for poor visibility in sports cars, large vans, and other vehicles with limited reflected rear view.

Figure 29:
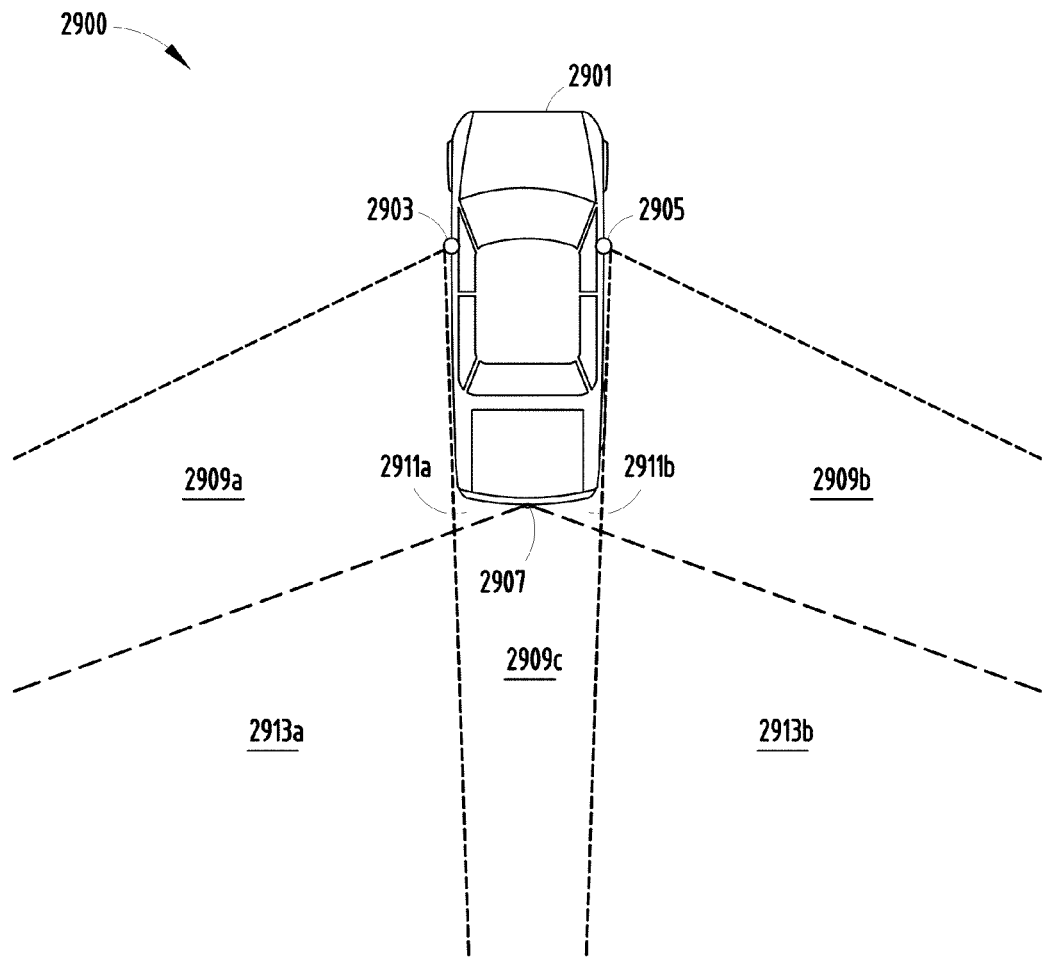
FIG. 29 is a top view diagram of the multi-display mirror system illustrating a curb view.

FIG. 30B illustrates a zoom down view to provide a more complete view of the surrounding vehicle. The zoom down view operates such that each camera is digitally focused on the view primarily downward from the vehicle so as to show provide a minimal blind zone within the field of view. FIG. 29 is a top view diagram of the field of view. The zoom down view 2900 is illustrated where a vehicle 2901 includes a left side camera 2903 and right side camera 2905. A rear camera 2907 operates to provide an image directly to the rear of the vehicle 2901 and substantially downward. In the zoom down view, the multi-display mirror system operates to provide a narrow view to the left side of the vehicle shown in area 2909a. Similarly, the right side camera 2905 provides a narrow view to the right side of the vehicle as shown by area

2909b. The narrow field of view operates at an angle formed at approximately 65 degrees to the rear of the left side camera 2903 or right side camera 2905 and the body of the vehicle 2901 such that the most rearward side panel of the vehicle is just visible in the output image of the camera image shown in FIG. 30B and blind zones in areas 2911a and 2911b are greatly reduced in size.

Overlapping zones, shown by areas 2913a and 2913b between the left side camera 2903, right side camera 2905 and the rear camera 2907, are also substantially increased in the zoom down view. For most low speed reversing maneuvers, the increased near field view of FIG. 30B is preferred over FIG. 30A. FIG. 30C further enhances the rearward view for the special condition of backing out of an alley or narrow passage. In such a situation, a focused view to the immediate right and left of the rearward path of the vehicle is helpful to detect approaching cross-traffic. In this mode, the rear camera alters the focus area to two locations, a right view and left view, and encodes the image data into an NTSC signal with a separation line between comprising a split-screen view. Thus, FIGS. 30A, 30B, and 30C depict three views to the driver, selectable through a pushbutton switch such as a "CAM" button, 2511, each viewing having a preferred usage. Those skilled in the art will further recognize that any number of views may be optimized and controlled manually, as depicted in FIG. 25, or automatically using various inputs from proximity sensors, gear position, speed sensors, additional cameras and the like without changing the scope of the present invention.

Figure 28:
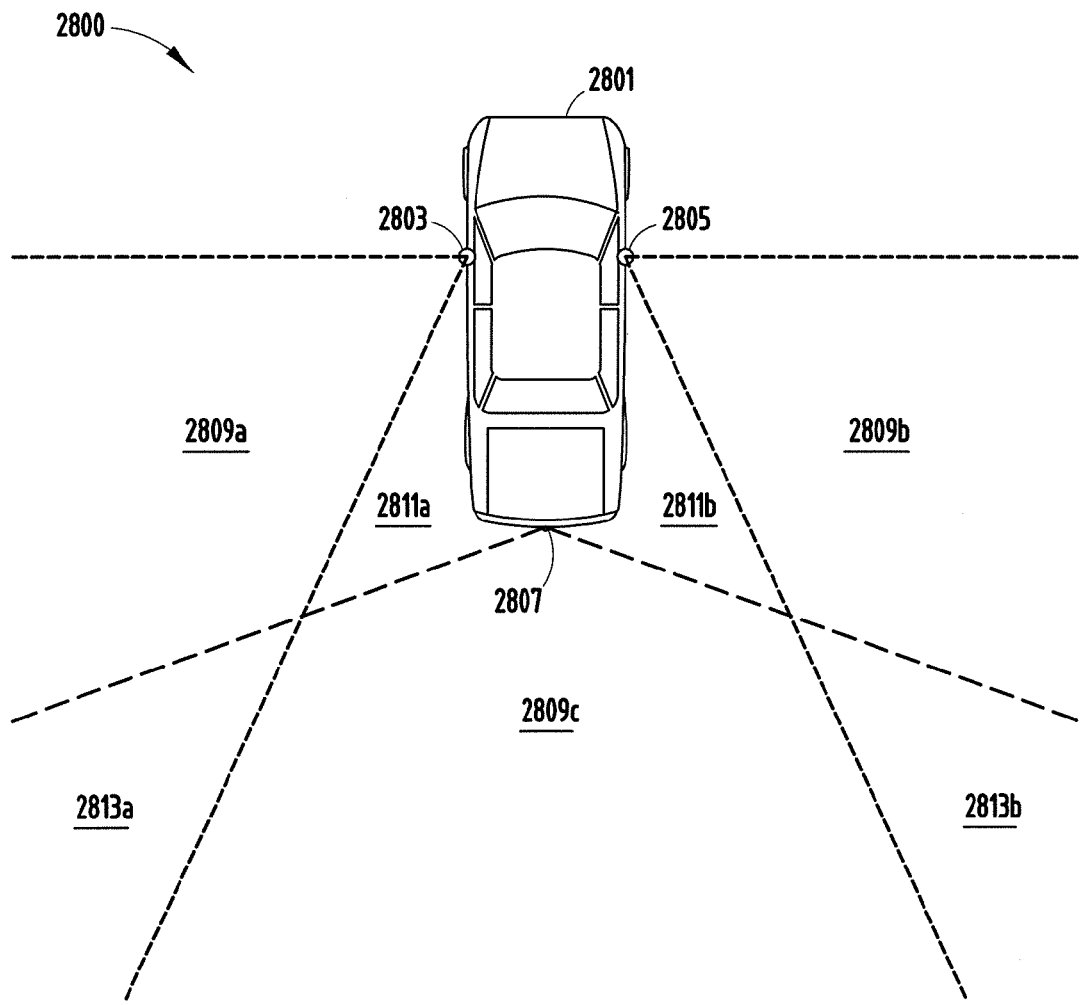
FIG. 28 is a top view diagram of the multi-display mirror system illustrating a panoramic field of view.

FIGS. 30D and 30E are examples of views used when the vehicle is in the drive mode. The panoramic view shown in FIG. 30D is similar to that shown in FIG. 30A. FIG. 30E illustrates a view where the left, rear, and right cameras are adjusted to show a panoramic image with a substantially wide angle constructed across the three displays. At low speeds, where overlap and differential motion effects are less objectionable, this view is provided to enhance the field of view. FIG. 28 is a top view diagram of the multi-display mirror system illustrating a panoramic type field of view provided by the system. The panoramic field of view 2800 is illustrated where a vehicle 2801 includes a left side camera 2803 and right side camera 2805 attached to the sides of the vehicle. Although the left side camera 2803 and right side camera 2805 are shown attached to vehicular side mirrors, it will be evident to those skilled in the art that other vehicle locations are also possible. A rear camera 2807 is attached to the rear of the vehicle proximate the center of the rear bumper typically in the area of license plate attachment (not shown). When used in a panoramic field of view, the multi-display mirror system provides a general field of view depicted by areas 2809a, 2809b and 2809c. The general field of view to the left of the vehicle in area 2809a typically extends at an angle of approximately 65 degrees from a line extending generally directly perpendicular to the left side camera 2803 extending from the vehicle 2801. Similarly, the general field of view on the right side of the vehicle in area 2809b extends approximately 65 degrees from a line formed directly perpendicular to the right side camera 2805 as extending from the vehicle 2801. The view from the rear camera 2807 extends at an angle of approximately 140 degrees from a line extending directly parallel to the rear camera 2807 view extending from the rear of the vehicle 2801. As seen in FIG. 28, the panoramic field of view 2800 also includes a blind zone in areas 2811a, 2811b and an overlapping zone in areas 2813a, 2813b as viewed from both the respective left camera 2803 or right camera 2805 and the rear camera 2807. In contrast to FIG. 29, the panoramic view expands the peripheral vision of the driver for forward motion at lower speeds.

FIGS. 30F and 30G illustrate an auto view mode for use when the vehicle utilizes its turn signal. In this mode, when the left turn signal is used, the left camera can provide a view on the left display of the left rear blind zone similar to the left display in FIG. 30B. The center and right displays provide a view similar to FIG. 30A. Conversely, when the right turn signal is used, the right camera can provide a view on the right display of the right rear blind zone similar to the right display in FIG. 30B. The center and left displays provide a view similar to FIG. 30A.

FIG. 30H illustrates the use of an auxiliary input where the left side display provides a global positioning system (GPS) map while the center and right displays show the same view as in FIG. 30F. This embodiment shows the flexibility of the system where other auxiliary inputs may be used to one or more of the displays for providing greater utility for the multi-display mirror system.

FIG. 31 is a block diagram illustrating steps used by the multi-display mirror system to provide a panoramic image. The process for providing panoramic images 3100 includes starting the imaging system 3101 and an electronic image is captured 3103. In order to reduce the size of the image, the original image is cropped 3105 at its top and bottom and then stretched vertically by the camera 3107. The image is then stretched horizontally over each of the three LCD displays 3109 where it displayed over three LCD displays 3111.

FIG. 32 is illustrations of the images used in the process of forming the panoramic image on the multi-display mirror system. The image process 3200 includes cropping an image 3201 at its top and bottom. The image 3201 illustrates the process of stretching the image vertically by the camera where the image is divided into thirds so it may be displayed over three LCD displays 3297, 3209 and 3211. The image 3205 illustrates each of the divided images displayed on each individual display to provide a panoramic image for the driver.

Thus, an embodiment of the present invention is directed to a multi-display automotive rearview mirror assembly for providing a driver with enhanced driver assist functionality that includes an electrochromic (EC) mirror element, a printed circuit board (PCB), a liquid crystal display (LCD) connected to the PCB for displaying information through the EC mirror element, a bus bar for providing electrical power to the LCD, a plurality of light emitting diodes formed into a matrix configuration mounted to the PCB for providing LCD backlighting, a radio frequency (RF) shield grounded to the PCB for shielding components on the PCB from RF energy emitted by the LCD and an elastomeric conductor for providing a grounding connection from the bus bar to the RF shield. The driver assist functions that are presented on the LCD can be dynamically scaled in size in order to present only a desired amount of information on the LCD. Additionally, the automotive rearview mirror assembly can further include a button bar actuator display extending below the EC mirror element for allowing the driver to configure or re-configure the LCD. The button bar actuator display can utilize the primary display LCD or a secondary LCD for allowing the driver to configure the LCD.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A multi-display vehicular rearview mirror system comprising:
    an electrochromic (EC) glass element;
    a plurality of liquid crystal displays (LCDs);
    a plurality of light emitting diodes (LEDs) for providing backlighting for each respective LCD of the plurality of LCDs; and
    wherein the LCDs utilize a plurality of imaging devices for creating a single image formed by the plurality of LCDs.

2. A multi-display vehicular rearview mirror system as in claim 1, wherein the imaging devices are digital cameras.

3. A multi-display vehicular rearview mirror system as in claim 2, wherein the digital cameras are positioned on the left side, right side and rear of a vehicle.

4. A multi-display vehicular rearview mirror system as in claim 2, wherein the digital cameras are positioned on a left side outside mirror and right side outside mirror.

5. A multi-display vehicular rearview mirror system as in claim 1, wherein information presented on the LCD can be dynamically scaled in order to present only a desired amount of information.

6. A multi-display vehicular rearview mirror system as in claim 1, wherein the plurality of LEDs are arranged into a plurality of separate matrix arrays.

7. A multi-display vehicular rearview mirror system as in claim 1, further comprising:
    a button bar actuator display for allowing the driver to configure the plurality of LCDs.

8. A multi-display vehicular rearview mirror system as in claim 1, wherein the plurality of LCDs operate to display driver assist features comprising at least one from the group of lane departure detection, forward collision detection, emergency braking detection, driver impairment monitoring, traffic speed sign recognition, pedestrian protection, headway monitoring, night vision, adaptive cruise control, vision range extension, blind spot detection, and rear camera display (RCD).

9. An automotive mirror system comprising:
    an electrochromic (EC) mirror element;
    a plurality of imaging devices attached to the vehicle;
    a plurality of liquid crystal displays (LCDs) for projecting light through the EC element;
    a plurality of light emitting diodes (LEDs) arranged in a matrix configuration for providing backlighting to the plurality of LCDs; and
    wherein a single image can be displayed over the plurality of LCDs such that at least one driver assist function is provided to the driver for enhancing safe vehicle operation.

10. A multi-display vehicular rearview mirror assembly as in claim 9, wherein the plurality of imaging devices are digital cameras.

11. A multi-display vehicular rearview mirror assembly as in claim 10, wherein the digital cameras are positioned on the left side, right side and rear of a vehicle.

12. A multi-display vehicular rearview mirror assembly as in claim 10, wherein the digital cameras are positioned on a left side outside mirror and right side outside mirror.

13. A vehicular rearview mirror assembly as in claim 9, wherein information presented on the LCD can be dynamically scaled in size in order to present only a desired amount of information.

14. An automotive rearview mirror assembly as in claim 9, further comprising a button bar actuator display positioned below the EC mirror element for allowing the driver to configure the LCD.

15. An automotive mirror assembly as in claim 9, wherein the at least one driver assist function comprises at least one from the group of: lane departure detector, forward collision detector, emergency braking detector, driver impairment monitoring detector, traffic speed sign recognition detector, pedestrian protection detector, headway monitoring detector, night vision detector, adaptive cruise control detector, vision range extension detector, blind spot detector, and rear camera display (RCD).

16. An multi-display vehicular rearview mirror system for providing a driver with enhanced driver assist functionality comprising:
    an electrochromic (EC) mirror element for use inside a vehicle;
    a plurality of liquid crystal displays (LCDs) for displaying information through the rear of the EC mirror element;
    a plurality of light emitting diodes formed into a matrix configuration for providing backlighting to the plurality of LCDs;
    a first imaging device attached to an first outside mirror assembly;
    a second imaging device attached to a second outside mirror assembly;
    a third imaging device attached to the rear of the vehicle; and
    wherein images from the first imaging device, second imaging device and third imaging device can be presented to form one image across the plurality of LCDs such that driver assist functions presented on the plurality of LCDs can be dynamically scaled in size in order to present only a desired amount of information on the plurality of LCDs.

17. An multi-display vehicular rearview mirror system as in claim 16, further comprising a button bar actuator display extending below the EC mirror element for allowing the driver to configure the LCD.

18. An multi-display vehicular rearview mirror system as in claim 16, wherein the driver assist features comprise at least one from the group of: lane departure detector, forward collision detector, emergency braking detector, driver impairment monitoring detector, traffic speed sign recognition detector, pedestrian protection detector, headway monitoring detector, night vision detector, adaptive cruise control detector, vision range extension detector, blind spot detector, and rear camera display (RCD).

19. An automotive multi-display rearview mirror system for providing video information through a plurality of LCD displays within a vehicle comprising:

an electrochromic (EC) glass element;

a first, second and third liquid crystal display (LCD) positioned behind the EC glass element;

a plurality of light emitting diodes (LEDs) for providing backlighting to the first, second and third LCD;

a first imaging device attached to a first outside mirror;

a second imaging device attached to a second outside mirror;

a third imaging device attached to the rear of the vehicle; and wherein the first imaging device, second imaging device and third imaging device provide a separate image to the first, second and third LCD display respectively for forming a substantially single image.

20. An automotive multi-display rearview mirror system as in claim 19, wherein the first, second and third imaging devices are digital cameras.

21. An automotive multi-display rearview mirror system as in claim 20, wherein the digital cameras are positioned on a left side outside mirror and right side outside mirror.

22. An automotive multi-display rearview mirror system as in claim 19, wherein the plurality of LEDs are arranged into separate matrix arrays for illuminating each respective first, second and third LCD.

23. An automotive multi-display rearview mirror system as in claim 19, further comprising a button bar actuator display for allowing the driver to configure the first, second and third LCD.

24. An automotive multi-display rearview mirror system as in claim 19, wherein the first, second or third LCDs provide a driver assist function presented to the driver that is scaled in size based upon the type of driver assist function.

25. An automotive multi-display rearview mirror system as in claim 24, wherein the driver assist function includes at least one from the group of: lane departure warning, adaptive cruise control, forward collision warning, emergency braking, driver impairment monitoring, traffic speed sign recognition, pedestrian detection, and vehicle blind spot detection.

* * * * *